US012306527B2

(12) United States Patent
Takimoto et al.

(10) Patent No.: US 12,306,527 B2
(45) Date of Patent: May 20, 2025

(54) OPTICAL ACTUATOR, CAMERA MODULE, AND CAMERA-MOUNTED DEVICE

(71) Applicants: Yukihiro Takimoto, Tokyo (JP); Atsushi Kikuchi, Tokyo (JP); Ichiro Hayashi, Tokyo (JP); Yoshihiro Kimura, Tokyo (JP)

(72) Inventors: Yukihiro Takimoto, Tokyo (JP); Atsushi Kikuchi, Tokyo (JP); Ichiro Hayashi, Tokyo (JP); Yoshihiro Kimura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 159 days.

(21) Appl. No.: 18/114,257

(22) Filed: Feb. 26, 2023

(65) Prior Publication Data

US 2023/0288776 A1   Sep. 14, 2023

(30) Foreign Application Priority Data

Mar. 9, 2022 (JP) ................................. 2022-036608

(51) Int. Cl.
*G03B 5/00* (2021.01)
*G03B 17/12* (2021.01)

(52) U.S. Cl.
CPC ............... *G03B 5/00* (2013.01); *G03B 17/12* (2013.01); *G03B 2205/0084* (2013.01)

(58) Field of Classification Search
CPC ... G03B 5/00; G03B 17/12; G03B 2205/0084
See application file for complete search history.

(56) References Cited

U.S. PATENT DOCUMENTS

| 2020/0225442 | A1 | 7/2020 | Weng et al. | |
| 2022/0365311 | A1* | 11/2022 | Jun | G02B 27/646 |
| 2023/0022577 | A1* | 1/2023 | Osaka | G03B 5/00 |
| 2023/0288720 | A1* | 9/2023 | Takimoto | G03B 3/10 |
| 2024/0243647 | A1* | 7/2024 | Lee | H04N 23/51 |
| 2024/0302625 | A1* | 9/2024 | Lee | G03B 17/02 |

FOREIGN PATENT DOCUMENTS

| JP | 2013-231928 | | 11/2013 |
| JP | 2013231928 A | * | 11/2013 |
| JP | 2020-126231 | | 8/2020 |

* cited by examiner

*Primary Examiner* — Clayton E. LaBalle
*Assistant Examiner* — Diana Hancock

(57) ABSTRACT

An optical actuator is an optical actuator configured to move an optical element by a driving part, and includes a movable-side member configured to hold the optical element, a fixed-side member configured to support the movable-side member such that the movable-side member is movable, and a cushioning member disposed on the movable-side member, in which the cushioning member includes a first cushioning surface and a second cushioning surface that face the fixed-side member at respective different distances.

7 Claims, 13 Drawing Sheets

OPTICAL ACTUATOR, CAMERA MODULE, AND CAMERA-MOUNTED DEVICE

CROSS REFERENCE TO RELATED APPLICATIONS

This application claims the benefit of priority of Japanese Patent Application No. 2022-36608 filed on Mar. 9, 2022, the contents of which are incorporated by reference as if fully set forth herein in their entirety.

TECHNICAL FIELD

The present invention relates to an optical actuator, a camera module, and a camera-mounted device.

BACKGROUND ART

Conventionally, thin camera-mounted devices equipped with a camera module, such as smartphones and digital cameras, are known. Each of the camera modules includes a lens part including one or more lenses (optical elements), and an image capturing device for capturing a subject image imaged by the lens part.

Further, there has been a proposal for a camera module having a folded optical system for guiding light to the lens part by bending, in a direction of a second optical axis, the light from the subject along a first optical axis using a prism (optical element) disposed adjacently to the lens part (e.g., Patent Literature (hereinafter referred to as "PTL") 1).

The camera module disclosed in PTL 1 includes a shake correction device that corrects a shake occurring in a camera, and an autofocus device that performs autofocus. Such a camera module includes a shake correcting actuator and an auto-focusing actuator as an optical actuator.

CITATION LIST

Patent Literature

PTL 1

Japanese Patent Application Laid-Open No. 2020-126231

SUMMARY OF INVENTION

Technical Problem

The above-described optical actuator does not have a function of absorbing, during normal operation of the camera module or during when an impact is applied from the outside, an impact caused by a collision between a movable-side member holding an optical element and a fixed-side member supporting the movable-side member such that the movable-side member is movable. Such an impact is undesirable because it causes damage to the movable-side member and the fixed-side member or causes generation of abnormal noise.

An object of the present invention is to provide an optical actuator, a camera module, and a camera-mounted device having a configuration making it possible to absorb an impact caused when a movable-side member and a fixed-side member collide with each other.

Solution to Problem

One aspect of an optical actuator according to the present invention is an optical actuator configured to move an optical element by a driving part, optical actuator including:
 a movable-side member configured to hold the optical element;
 a fixed-side member configured to support the movable-side member such that the movable-side member is movable; and
 a cushioning member disposed on the movable-side member, in which
 the cushioning member includes a first cushioning surface and a second cushioning surface that face the fixed-side member at respective different distances.

One aspect of a camera module according to the present invention includes:
 an above-described optical actuator; and
 an image capturing device disposed adjacently to the optical actuator.

One aspect of a camera-mounted device according to the present invention includes:
 an above-described camera module; and
 a control part configured to control the camera module.

Advantageous Effects of Invention

According to the present invention, it is possible to provide an optical actuator, a camera module, and a camera-mounted device having a configuration making it possible to absorb an impact when the movable-side member and the fixed-side member collide with each other.

DESCRIPTION OF EMBODIMENTS

Figure 1:
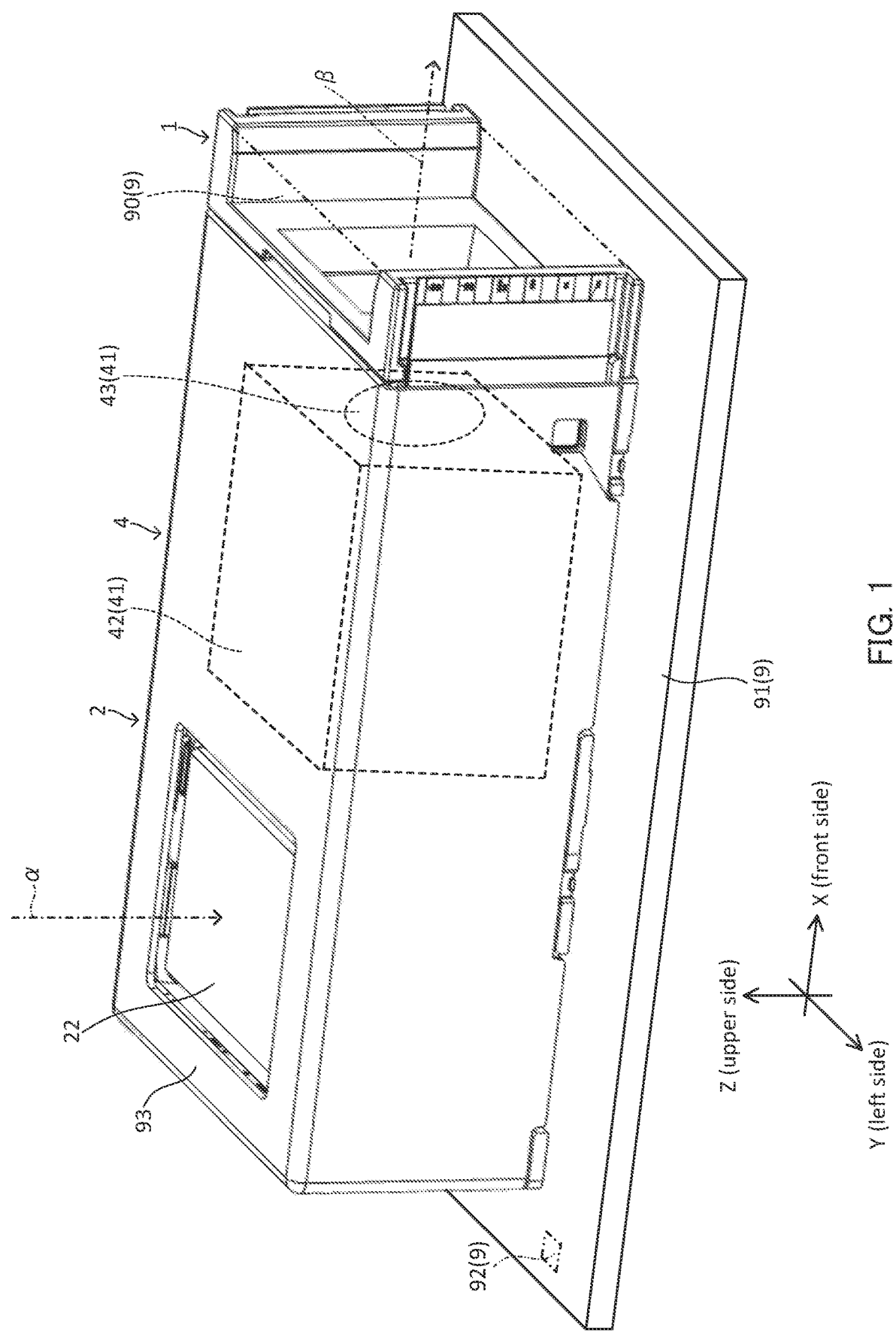
FIG. 1 is a perspective view schematically illustrating a camera module according to an embodiment of the present invention.

Hereinafter, an embodiment according to the present invention is described in detail with reference to the drawings. Note that an optical actuator, a camera module, and a camera-mounted device according to embodiments described below are examples of the optical actuator, the camera module, and the camera-mounted device according to the present invention. The present invention is not limited by the embodiments.

EMBODIMENTS

Referring to FIGS. 1 to 17B, camera module 1 according to an embodiment of the present disclosure will be described. Hereinafter, a description will be given of the outline of camera module 1, and then, the structure of optical path bending module 2, lens module 4, and image capturing device module 9 included by camera module 1 will be described. Note that the optical actuator, the camera module, and the camera-mounted device according to the present invention may have all configurations described later, or do not have to have some of the configurations.

Camera module 1 is mounted, for example, in smartphone M (see FIG. 16A and FIG. 16B), a mobile phone, a digital camera, a notebook personal computer, a tablet terminal, a portable game machine, a thin camera-mounted device (in-vehicle camera), and the like. Smartphone M includes a dual camera consisting of two back side cameras OC1 and OC2. In the present embodiment, camera module 1 is applied to back side camera OC2.

Hereinafter, components constituting camera module 1 of the present embodiment will be described with reference to a state in which the components are incorporated in camera module 1. In explaining the structure of camera module 1 of the present embodiment, an orthogonal coordinate system (X, Y, Z) indicated in the figures is used.

Camera module 1 is mounted such that the horizontal (lateral) direction of the camera-mounted device is the X-direction, the vertical direction of the camera-mounted device is the Y-direction, and the front-rear direction of the camera-mounted device is the Z-direction, for example, during actual image capturing with the camera-mounted device. Light from a subject (incident light) is incident on prism 22 of optical path bending module 2 from the + side (plus side) of camera module 1 in the Z direction as illustrated by single-dot dashed line α in FIG. 1 (also referred to as "first optical axis"). Prism 22 corresponds to one example of an optical path bending member.

The light incident on prism 22 (emitted light) is bent by an optical path bending surface of prism 22 (see FIG. 2) and guided to lens part 41 of lens module 4 disposed upstream of prism 22 (+ side in the X direction), as illustrated by single-dot dashed line β in FIG. 1 (also referred to as "second optical axis").

Then, a subject image imaged by lens part 41 is captured by image capturing device module 9 disposed upstream of lens module 4 (see FIG. 1).

Camera module 1 of the present embodiment performs Optical Image Stabilization (OIS) by optical image stabilization device 3 incorporated in optical path bending module 2. That is, optical path bending module 2 has an optical image stabilization function.

Further, camera module 1 of the present embodiment performs autofocus by displacing the lens part in the X direction using an Auto Focus (AF) device (not illustrated) incorporated in lens module 4. That is, lens module 4 has an autofocus function.

Optical path bending module 2 includes cover 93, first base 21, prism 22, and optical image stabilization device 3.

Specifically, first base 21 includes first base main body 210 and supporting wall portion 214. First base 21 combined with cover 93 forms an accommodation space in which prism 22 and optical image stabilization device 3 can be disposed.

First base main body 210 is a U-shaped member that opens at a front end, a rear end, and an upper end. Specifically, first base main body 210 includes bottom wall portion 211, left wall portion 212, and right wall portion 213. First base main body 210 is connected to a second base (not illustrated) of lens module 4 at a front end portion thereof. That is, first base main body 210 and the second base are integral with each other.

Bottom wall portion 211 has a plate shape parallel to the XY plane. Bottom wall portion 211 includes a second coil placement portion (not illustrated) for placing a second coil (not illustrated) of a second driving part. The second driving part is a voice coil motor, and swings holder 31 around second axis A2 (see FIG. 2). Second axis A2 is an axis extending through the center of ball 331 of below-described swing supporting portion 33 (see FIG. 2) and being parallel to the Y direction.

Left wall portion 212 has a plate shape parallel to the XZ plane and the lower end portion thereof is connected to the left end portion of bottom wall portion 211. Left wall portion 212 includes a left-side first coil placement portion (not illustrated) for placing a left-side first coil (not illustrated) of a first driving part. The first driving part is a voice coil motor, and swings holder 31 about first axis A1. First axis A1 is an axis parallel to the Z direction. Specifically, first axis A1 is an axis extending through the center of ball 331 of swing supporting portion 33 (see FIG. 2) and being parallel to the Z direction.

Left wall portion 212 includes base-side receiving portion 212a (see FIG. 6) on its inner peripheral surface. Base-side receiving portion 212a has a plate shape that is parallel to the YZ plane. Base-side receiving portion 212a faces the front end surface of below-described left wall portion 311 of holder 31 in the front-rear direction.

Right wall portion 213 has a plate shape parallel to the XZ plane and the lower end portion thereof is connected to the right end portion of bottom wall portion 211. Right wall portion 213 includes a right-side first coil placement portion (not illustrated) for placing a right-side first coil (not illustrated) of the first driving part.

Right wall portion 213 includes base-side receiving portion 213a (see FIG. 6) on its inner peripheral surface. Base-side receiving portion 213a has a plate shape that is parallel to the YZ plane. Base-side receiving portion 213a faces the front end surface of right wall portion 312 of below-described holder 31 in the front-rear direction.

Supporting wall portion 214 is a member separate from first base main body 210, and includes rear wall portion 214a and supporting portion 214b. Rear wall portion 214a has a plate shape parallel to the YZ plane. Rear wall portion 214a blocks the rear end of first base main body 210. Rear wall portion 214a is supported by first base main body 210 via a biasing spring (not illustrated).

Figure 2:
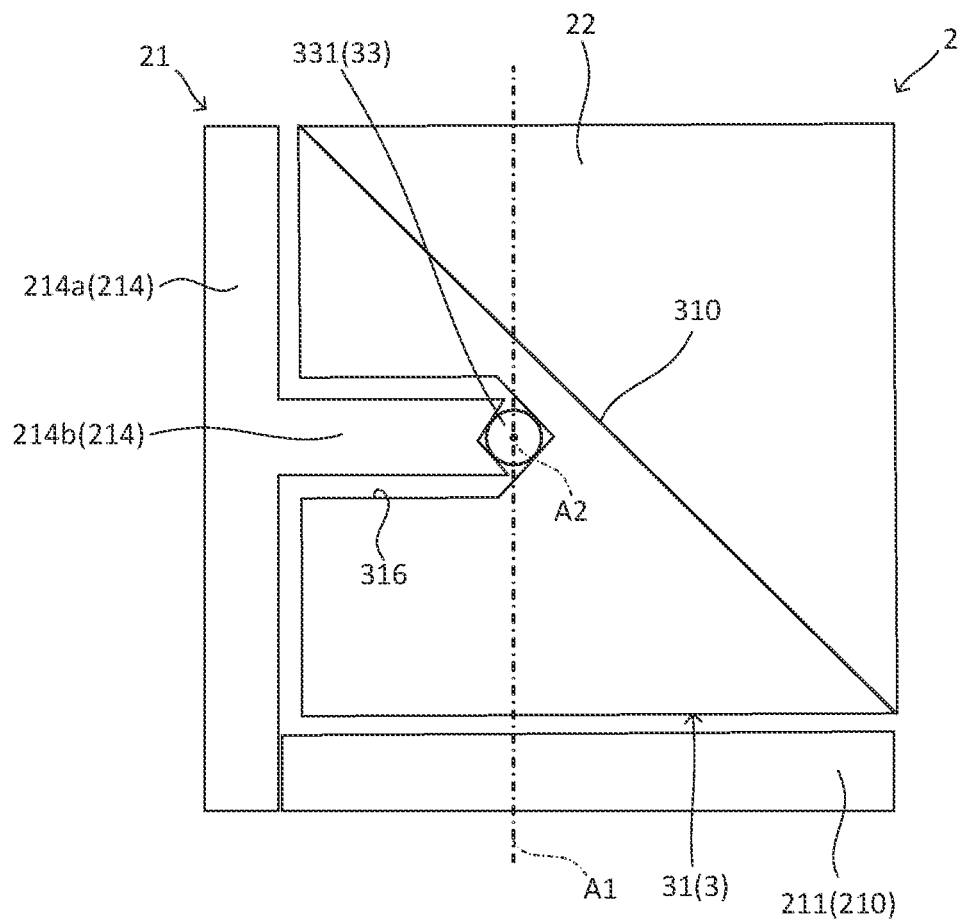
FIG. 2 is a schematic diagram of an optical path bending module.
Figure 3:
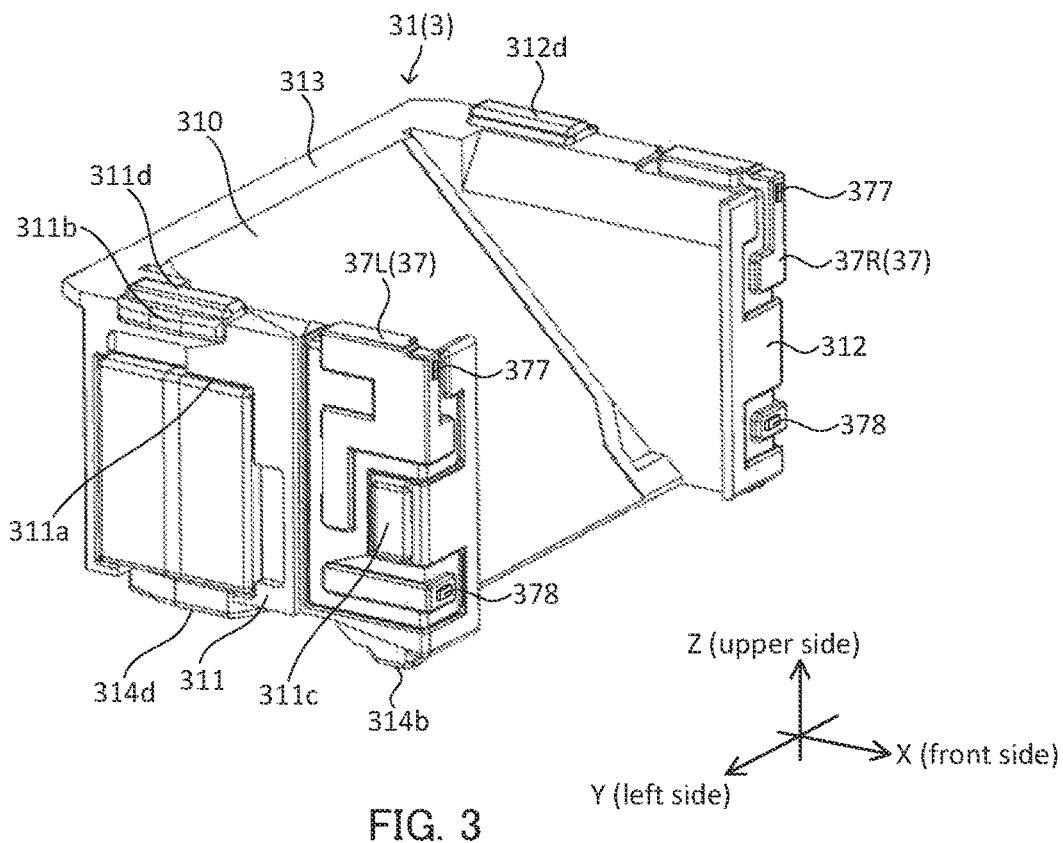
FIG. 3 is a perspective view of a holder.
Figure 4:
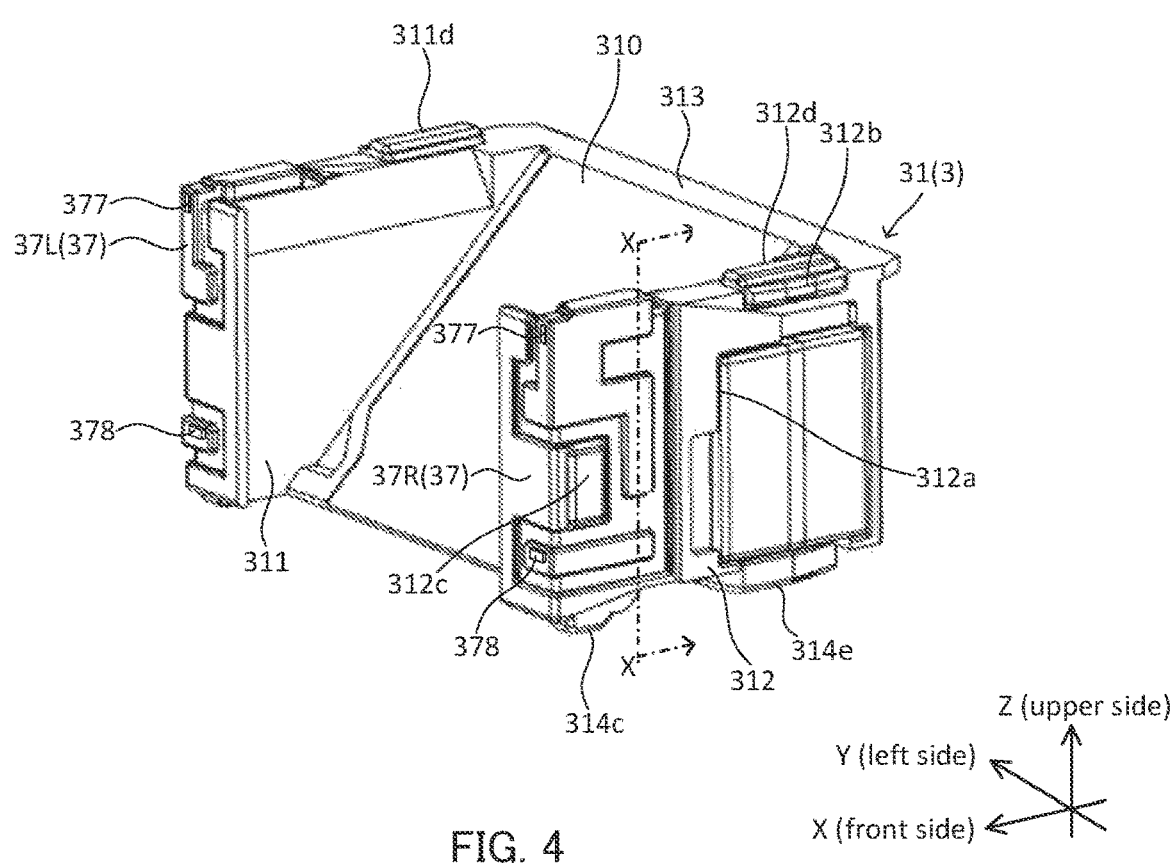
FIG. 4 is another perspective view of the holder.

As illustrated in FIG. 2, supporting portion 214b is for supporting holder 31 such that the holder is swingable, and is disposed on the front-side surface of rear wall portion 214a. Supporting portion 214b is formed in the form of a protruding portion extending forward (+ side in the X direction) from rear wall portion 214a.

While inserted into recessed portion 316 of holder 31 described later, supporting portion 214b supports holder 31 via ball 331 such that the holder is swingable.

In the case of the present embodiment, supporting portion 214b is disposed on rear wall portion 214a of first base 21. However, the configuration of the supporting portion is not limited to that of the case of the present embodiment. For example, the supporting portion may be disposed on the bottom wall portion of the first base. In this case, the supporting portion may extend upward from the bottom wall portion of the first base. In this case, the recessed portion of the holder may be formed in the lower-side surface of the holder.

Next, optical image stabilization device 3 will be described. Optical image stabilization device 3 performs optical image stabilization in the rotational direction around first axis A1 parallel to the Z direction and the rotational direction around second axis A2 parallel to the Y direction by causing prism 22 to swing around first axis A1 and second axis A2. Optical image stabilization device 3 as described above is disposed in an accommodation space surrounded by cover 93, bottom wall portion 211, left wall portion 212, right wall portion 213, and rear wall portion 214a of first base 21.

Optical image stabilization device 3 includes holder 31, cushioning member 37, swing supporting portion 33, the first driving part, and the second driving part.

In optical image stabilization device 3, holder 31 is supported by first base 21 via swing supporting portion 33. Holder 31 is swingable about first axis A1 and is swingable about second axis A2 with respect to first base 21. Holder 31 in this state swings about first axis A1 based on a driving force generated by the first driving part, and swings about second axis A2 based on a driving force generated by the second driving part.

Each of the first driving part and the second driving part is a voice coil motor, and includes a coil and a magnet. However, the first driving part and the second driving part are not limited to the voice coil motor. The first driving part and the second driving part may be various driving parts capable of swinging holder 31 about first axis A1 and about second axis A2 with respect to first base 21.

When the first driving part is driven under the control of control part 92 (see FIG. 1), holder 31 and prism 22 are swung about first axis A1. Thus, shake in the rotational direction around first axis A1 is corrected.

Further, when the second driving part is driven under the control of control part 92 (see FIG. 1), holder 31 and prism 22 are swung about second axis A2. Thus, shake in the rotational direction around second axis A2 is corrected. Hereinafter, a specific structure of each member included in optical image stabilization device 3 will be described.

Holder 31 corresponds to one example of a base portion being a part of a movable-side member, and is disposed in a space surrounded by bottom wall portion 211, left wall portion 212, right wall portion 213, and rear wall portion 214a of first base 21. Holder 31 supports prism 22 (see FIG. 1) with respect to first base 21 such that the prism is swingable. Note that holder 31 and a member that swings together with holder 31 (for example, cushioning member 37 described later) correspond to one example of the movable-side member.

Holder 31 is swingable about first axis A1 and is swingable about second axis A2 with respect to first base 21. Therefore, prism 22 is also swingable about first axis A1 and swingable about second axis A2 with respect to first base 21.

Specifically, holder 31 is made of synthetic resin, and has mounting surface 310 on which prism 22 is mounted, left wall portion 311, right wall portion 312, rear wall portion 313, and bottom wall portion 314.

Mounting surface 310 is an inclined surface that is inclined downward (on the − side in the Z-direction) with decreasing distance to the front side (on the + side in the X-direction).

Left wall portion 311 is disposed on the left side of mounting surface 310. Left wall portion 311 is disposed inside left wall portion 212 of first base 21, and faces left wall portion 212 of first base 21 in the left-right direction (Y direction).

Right wall portion 312 is disposed on the right side of mounting surface 310. Right wall portion 312 is disposed inside right wall portion 213 of first base 21, and faces right wall portion 213 of first base 21 in the left-right direction (Y direction).

Rear wall portion 313 is disposed on the rear side of mounting surface 310. Rear wall portion 313 is disposed on the front side of rear wall portion 214a of first base 21, and faces rear wall portion 214a of first base 21 in the front-rear direction (X direction).

Bottom wall portion 314 is disposed on the lower side of mounting surface 310. Bottom wall portion 314 is disposed above bottom wall portion 211 of first base 21, and faces bottom wall portion 211 of first base 21 in the upper-lower direction (Z direction).

Holder 31 includes recessed portion 316 extending from rear wall portion 313 toward the center of the mounting surface at the rear side of mounting surface 310. The rear end portion of recessed portion 316 opens in the rear-side surface of rear wall portion 313.

Further, holder 31 includes, on the left-side surface of left wall portion 311, left-side first magnet placement portion 311a for placing a left-side first magnet of the first driving part. Left-side first magnet placement portion 311a is formed in the form of a recessed portion. Left-side first magnet placement portion 311a faces a left-side first coil placement portion (not illustrated) of first base main body 210 in the left-right direction.

Further, holder 31 includes, on the right-side surface of right wall portion 312, right-side first magnet placement portion 312a for placing a right-side first magnet of the first driving part. Right-side first magnet placement portion 312a is formed in the form of a recessed portion. Right-side first magnet placement portion 312a faces a right-side first coil placement portion (not illustrated) of first base main body 210 in the left-right direction.

Holder 31 includes a left-side receiving portion on the left-side surface of left wall portion 311. The left-side receiving portion is a portion that is brought into contact with first base 21 and receives an impact caused by the contact made when an impact due to a drop or the like (hereinafter, simply referred to as "impact") is applied to camera module 1 and holder 31 is moved to the left side.

Hereinafter, the configuration of the left-side receiving portion will be described. Holder 31 includes left-side receiving portions 311b and 311c on the left-side surface of left wall portion 311. Each of the left-side receiving portions 311b and 311c is formed in the form of a protruding portion protruding leftward from the left-side surface of left wall portion 311.

Left-side receiving portion 311b is disposed on an upper end portion of the left-side surface of left wall portion 311. Further, left-side receiving portion 311c is disposed on a front end portion of the left-side surface of left wall portion 311.

The left-side surface (tip end surface) of left-side receiving portion 311b and the left-side surface (tip end surface) of left-side receiving portion 311c are located on the left side with respect to a portion of the left-side surface of left wall portion 311 other than left-side receiving portion 311b and left-side receiving portion 311c. The left-side surface (tip end surface) of left-side receiving portion 311b and the left-side surface (tip end surface) of left-side receiving portion 311c are located on the same plane that is parallel to the XZ plane.

The left-side surface (tip end surface) of left-side receiving portion 311c is also a portion that makes contact with first base 21 (specifically, the inner surface of left wall portion 212) and absorbs the impact caused when holder 31 swings in one direction (clockwise direction in FIG. 6) about first axis A1 by an amount equal to or greater than a predetermined amount during a normal operation of optical path bending module 2.

Holder 31 includes a right-side receiving portion on a right-side surface of right wall portion 312. The right-side receiving portion is a portion that makes contact with first base 21 and receives an impact caused by the contact made when an impact is applied to camera module 1 and holder 31 is moved rightward.

Hereinafter, the configuration of the right-side receiving portion will be described. Holder 31 includes right-side receiving portions 312b and 312c on a right-side surface of right wall portion 312. Each of right-side receiving portions 312b and 312c is formed in the form of a protruding portion protruding to the right side from the right-side surface of right wall portion 312.

Right-side receiving portion 312b is disposed on an upper end portion of the right-side surface of right wall portion 312. Right-side receiving portion 312c is disposed on a front end portion of the right-side surface of right wall portion 312.

The right-side surface (tip end surface) of right-side receiving portion 312b and the right-side surface (tip end surface) of right-side receiving portion 312c are located on the right side with respect to a portion of the right-side surface of right wall portion 312 other than right-side receiving portion 312b and right-side receiving portion 312c. The right-side surface (tip end surface) of right-side receiving portion 312b and the right-side surface (tip end surface) of right-side receiving portion 312c are located on the same plane that is parallel to the XZ plane.

Note that, the right-side surface (tip end surface) of right-side receiving portion 312c is also a portion that makes contact with first base 21 (specifically, the inner surface of right wall portion 213) and receives the impact caused when holder 31 swings in the other direction (a direction opposite to the clockwise direction in FIG. 6) about first axis A1 by an amount equal to or greater than a predetermined amount in the normal operation of optical path bending module 2.

Holder 31 includes an upper-side receiving portion. The upper-side receiving portion is a portion that is brought into contact with cover 93 and receives an impact caused by the contact made when an impact is applied to camera module 1 and holder 31 is moved upward.

Hereinafter, the configuration of the upper-side receiving portion will be described. Holder 31 includes upper-side receiving portion 311d on an upper-side surface of left wall portion 311. Upper-side receiving portion 311d is formed in the form of a protruding portion protruding upward from the upper-side surface of left wall portion 311. The upper-side surface (tip end surface) of upper-side receiving portion 311d is located on the upper-side surface on the upper side with respect to a portion of the upper-side surface of left wall portion 311 other than upper-side receiving portion 311d.

Holder 31 includes upper-side receiving portion 312d on an upper-side surface of right wall portion 312. Upper-side receiving portion 312d is formed in the form of a protruding portion protruding upward from the upper-side surface of right wall portion 312. The upper-side surface (tip end surface) of upper-side receiving portion 312d is located on the upper side with respect to a portion of the upper-side surface of right wall portion 312 other than upper-side receiving portion 312d.

The upper-side surface (tip end surface) of upper-side receiving portion 311d and the upper-side surface (tip end surface) of upper-side receiving portion 312d are located on the same plane that is parallel to the XY plane.

Holder 31 includes a lower-side receiving portion on the lower-side surface of bottom wall portion 314. The lower-side receiving portion is a portion that makes contact with first base 21 and receives an impact caused by the contact made when an impact is applied to camera module 1 and holder 31 moves downward.

Hereinafter, the configuration of the lower-side receiving portion will be described. Holder 31 includes a plurality of lower-side receiving portions on the lower-side surface of bottom wall portion 314. The plurality of lower-side receiving portions are disposed distributedly on the lower-side surface of bottom wall portion 314.

Specifically, holder 31 includes lower-side receiving portions 314b and 314c on the lower-side surface of bottom wall portion 314. Lower-side receiving portion 314b is disposed on a front left end portion of the lower-side surface of bottom wall portion 314. Lower-side receiving portion 314c is disposed on a front right end portion of the lower-side surface of bottom wall portion 314.

Each of lower-side receiving portions 314b and 314c is formed in the form of a protruding portion protruding downward from the lower-side surface of bottom wall portion 314.

Holder 31 includes lower-side receiving portions 314d and 314e on the lower-side surface of bottom wall portion 314. Lower-side receiving portion 314d is disposed on a portion of the lower-side surface of bottom wall portion 314 which extends from the rear end portion to an intermediate portion in the front-rear direction and is close to the left end portion.

Further, lower-side receiving portion 314e is disposed on a portion of the lower-side surface of bottom wall portion 314 which extends from the rear end portion to an intermediate portion in the front-rear direction and is close to the right end portion. In other words, lower-side receiving portions 314d and 314e are disposed at positions sandwiching second magnet placement portion 314a at the lower-side surface of bottom wall portion 314 in the left-right direction.

Each of lower-side receiving portions 314d and 314e is formed in the form of a protruding portion protruding downward from the lower-side surface of bottom wall portion 314.

The lower-side surfaces (tip end surfaces) of lower-side receiving portions 314b, 314c, 314d, and 314e are positioned lower than the lower-side surface of bottom wall portion 314 except for lower-side receiving portions 314b, 314c, 314d, and 314e. Each of the lower-side surfaces (tip end surfaces) of lower-side receiving portions 314b, 314c, 314d, and 314e is located on the same plane that is parallel to the XY plane.

Further, holder 31 includes left-side holding portion 32L on the left-side surface of left wall portion 311. Left-side holding portion 32L is a portion that holds left-side cushioning member 37L described later. Based on the engagement with left-side cushioning member 37L, left-side holding portion 32L holds left-side cushioning member 37L such that left-side cushioning member 37L is prevented from coming off.

Figure 5A:
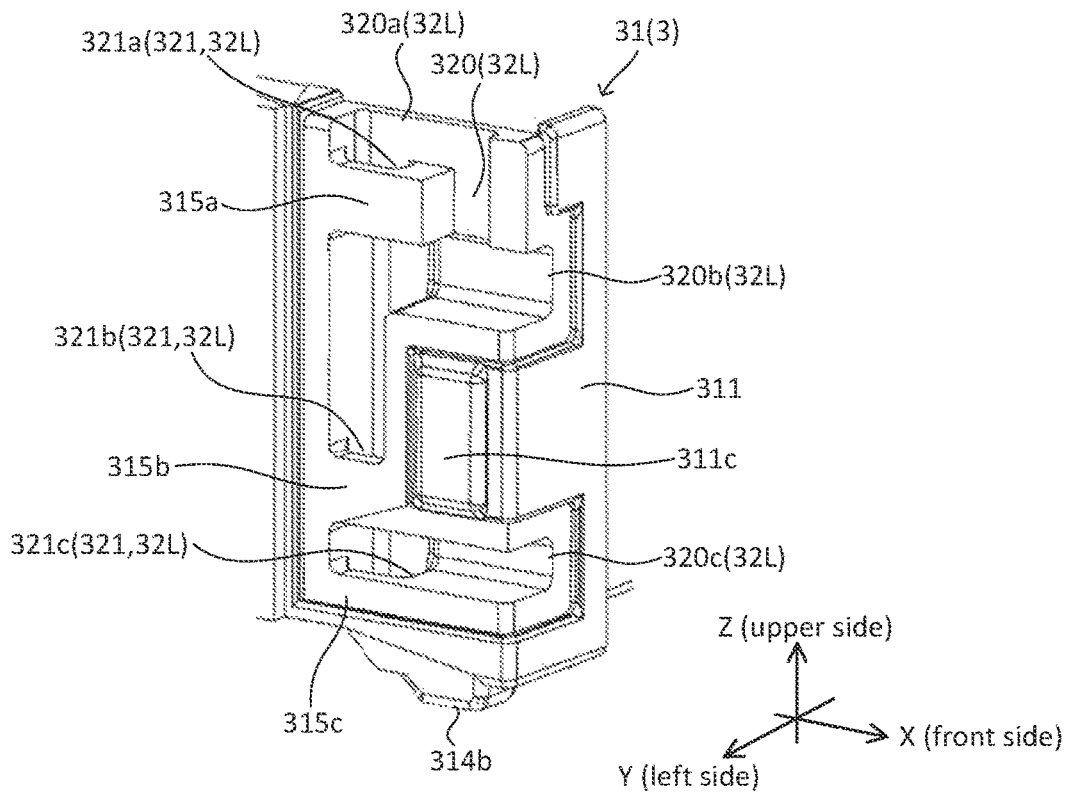
FIG. 5A is a view for explaining a left-side holding portion of the holder.

Hereinafter, the configuration of left-side holding portion 32L will be described with reference to FIG. 5A. Left-side holding portion 32L includes groove portion 320 and through-hole 321. Left-side holding portion 32L is formed by a combination of at least one groove portion 320 and at least one through-hole 321.

Groove portion 320 is disposed in the left-side surface of left wall portion 311, and is entirely open in the left-side surface of left wall portion 311. Further, groove portion 320 includes upper-side opening portion 320a that opens in the upper-side surface of left wall portion 311. Groove portion 320 includes front-side opening portions 320b and 320c that open in the front-side surface of left wall portion 311. Front-side opening portion 320b is disposed above front-side opening portion 320c.

In the case of the present embodiment, groove portion 320 is composed of a combination of a front-rear groove portion extending in the front-rear direction and an upper-lower groove portion extending in the upper-lower direction. Hereinafter, elements such as the front-rear groove portion and the upper-lower groove portion constituting groove portion 320 will be referred to as groove elements. Note that, the shape of the groove portion is not limited to the shape of groove portion 320 of the present embodiment. For example, the groove portion may include a groove portion having various shapes such as an oblique groove portion extending obliquely and an arc-shaped groove portion having an arc shape. In this case, the oblique groove portion or the arc-shaped groove portion is also included in the groove elements.

Through-hole 321 is disposed in left wall portion 311 of holder 31 so as to extend through partition wall portions 315a, 315b, and 315c existing between adjacent groove elements or at a position adjacent to the groove portions. At least one end portion of through-hole 321 is connected to the groove elements.

In the present embodiment, through-hole 321 includes three through-holes 321a, 321b, and 321c. However, the number of through-holes is not particularly limited. At least one through-hole only needs to be provided. Further, in the case where the structure of the left-side holding portion is a structure in which it is possible to prevent the left-side cushioning member from coming off even when the through-hole is omitted, the through-hole may be omitted.

Through-hole 321a extends through partition wall portion 315a of left wall portion 311 in the upper-lower direction. Through-hole 321a is a through-hole that opens only at the upper end portion and the lower end portion. That is, through-hole 321a does not open in the left-side surface of left wall portion 311. Through-hole 321a connects adjacent groove elements to each other.

Through-hole 321b extends through partition wall portion 315b of left wall portion 311 in the upper-lower direction. Through-hole 321b is a through-hole that opens only at the upper end portion and the lower end portion. That is, through-hole 321b does not open in the left-side surface of left wall portion 311. Through-hole 321b connects adjacent groove elements to each other.

Through-hole 321c extends through partition wall portion 315c of left wall portion 311 in the upper-lower direction. Through-hole 321c is a through-hole that opens only at the upper end portion and the lower end portion. That is, through-hole 321c does not open in the left-side surface of left wall portion 311. One end portion (upper end portion) of through-hole 321c is connected to a groove element. The other end portion (lower end portion) of through-hole 321c is not connected to any groove element.

In the present embodiment, each of through-holes 321a, 321b, and 321c extends through partition wall portion 315a, 315b, or 315c of left wall portion 311 in the upper-lower direction. That is, through-hole 321 includes a plurality of through-holes extending in the same direction. However, the shapes of the through-holes are not limited to the shapes of through-holes 321 of the present embodiment. For example, the through-holes may have a structure that extends through the partition wall portions of the left wall portion in the front-rear direction. In addition, the through-holes may have a structure that obliquely extends through the partition wall portions of the left wall portion. The through-holes may be composed of a plurality of through-holes extending in different directions.

Left-side cushioning member 37L, which will be described later, is held in left-side holding portion 32L having the above configuration. In this state, left-side cushioning member 37L is prevented from coming off in the front-rear direction, the left-right direction, and the upper-lower direction by left-side holding portion 32L.

Further, holder 31 includes right-side holding portion 32R on the right-side surface of right wall portion 312. Right-side holding portion 32R is a portion that holds right-side cushioning member 37R described later. Based on the engagement with right-side cushioning member 37R, right-side holding portion 32R holds right-side cushioning member 37R such that right-side cushioning member 37R is prevented from coming off.

Figure 5B:
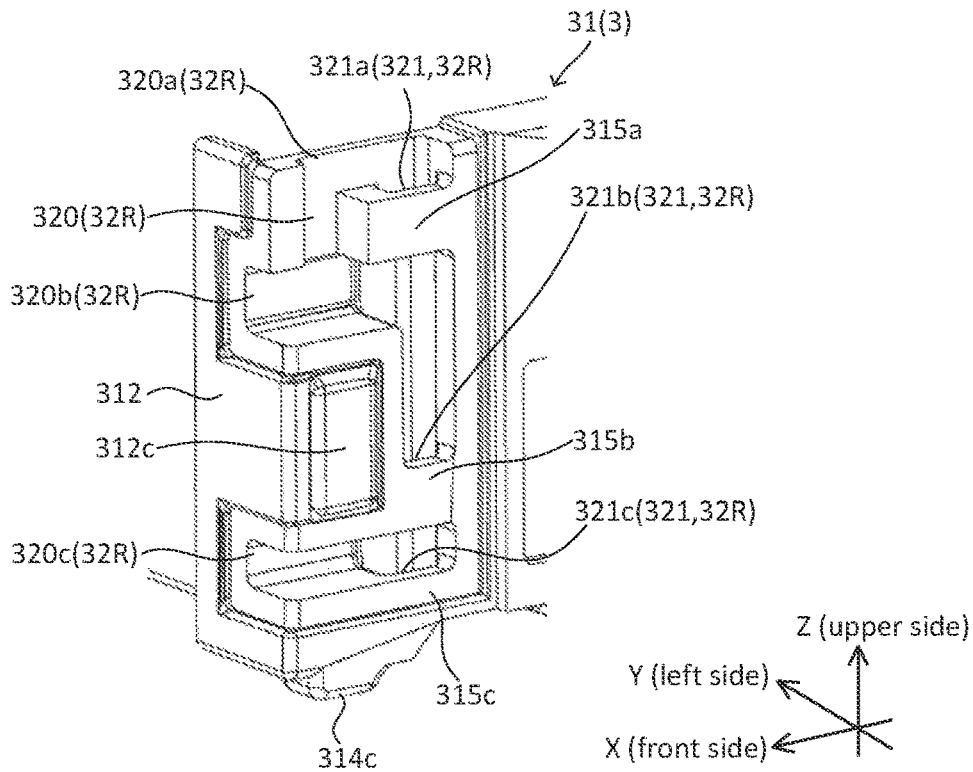
FIG. 5B is a view for explaining a right-side holding portion of the holder.
Figure 6:
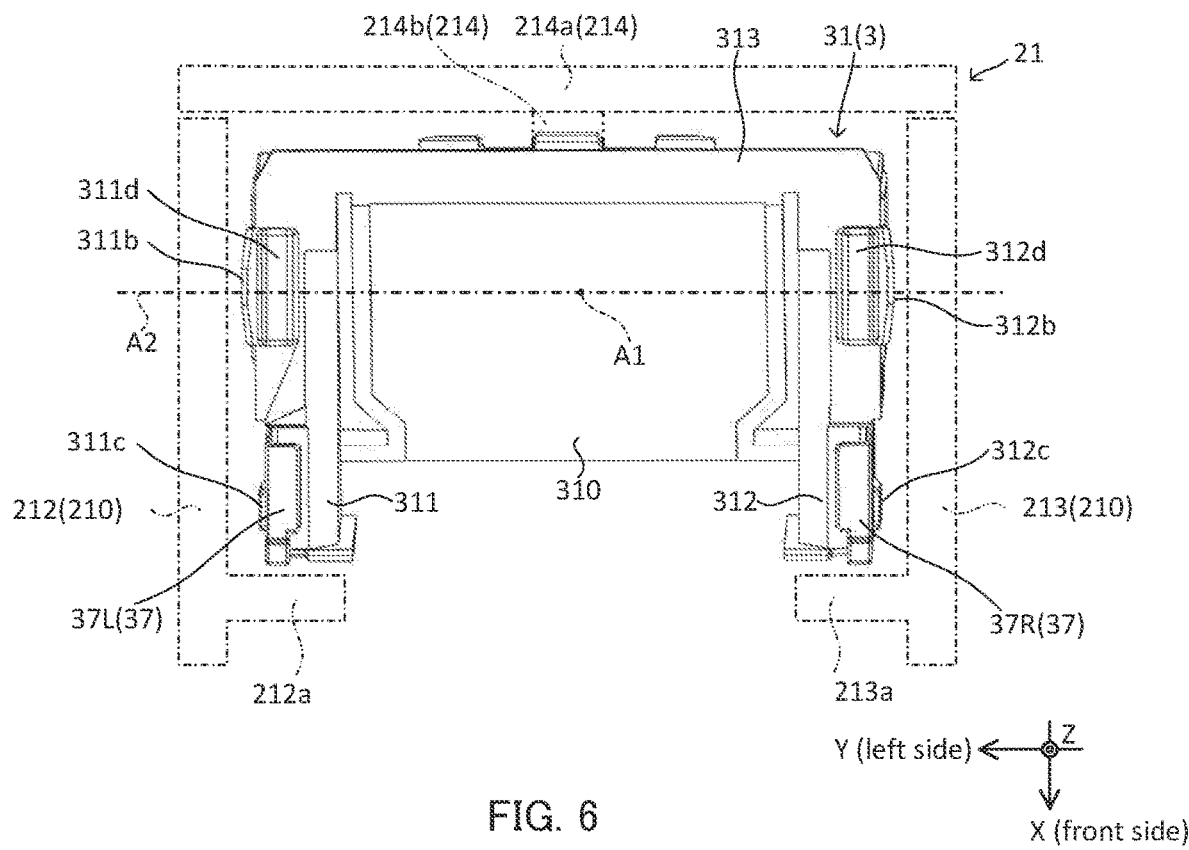
FIG. 6 is a plan view of the holder.

Hereinafter, the configuration of right-side holding portion 32R will be described with reference to FIG. 5B of the drawings. Right-side holding portion 32R includes groove portion 320 and through-hole 321. Right-side holding portion 32R is formed by a combination of at least one groove portion 320 and at least one through-hole 321. In the present embodiment, the shape of right-side holding portion 32R has a shape symmetrical to left-side holding portion 32L in the left-right direction.

Groove portion 320 is disposed in the right-side surface of right wall portion 312, and is entirely open in the right-side surface of right wall portion 312. Further, groove portion 320 includes upper-side opening portion 320a that opens in the upper-side surface of right wall portion 312. Groove portion 320 includes front-side opening portions 320b and 320c that open in the front-side surface of right wall portion 312. Front-side opening portion 320b is disposed in the upper side of front-side opening portion 320c.

Through-hole 321 is disposed in right wall portion 312 of holder 31 so as to extend through partition wall portions 315a, 315b, and 315c existing between adjacent groove elements or at a position adjacent to the groove elements. At least one end portion of through-hole 321 is connected to the groove elements. The definition of the groove elements is the same as the definition of the groove elements of left-side holding portion 32L.

In the present embodiment, through-hole 321 includes three through-holes 321a, 321b, and 321c. However, the number of through-holes is not particularly limited. At least one through-hole only needs to be provided. Further, in the case where the structure of the right-side holding portion is a structure in which it is possible to prevent the right-side cushioning member from coming off even when the through-hole is omitted, the through-hole may be omitted.

Through-hole 321a extends through partition wall portion 315a of right wall portion 312 in the upper-lower direction. Through-hole 321a is a through-hole that opens only at the upper end portion and the lower end portion. That is, through-hole 321a does not open in the right-side surface of right wall portion 312. Through-hole 321a connects adjacent groove elements to each other.

Through-hole 321b extends through partition wall portion 315b of right wall portion 312 in the upper-lower direction. Through-hole 321b is a through-hole that opens only at the upper end portion and the lower end portion. That is, through-hole 321b does not open in the right-side surface of right wall portion 312. Through-hole 321b connects adjacent groove elements to each other.

Through-hole 321c extends through partition wall portion 315c of right wall portion 312 in the upper-lower direction. Through-hole 321c is a through-hole that opens only at the upper end portion and the lower end portion. That is, through-hole 321c does not open in the right-side surface of right wall portion 312. One end portion (upper end portion) of through-hole 321c is connected to a groove element. The other end portion (lower end portion) of through-hole 321c is not connected to any groove element.

In the present embodiment, through-hole 321 extends through the partition wall portion of the right wall portion in the upper-lower direction. That is, through-hole 321 includes a plurality of through-holes extending in the same direction. However, the shape of the through-holes is not limited to the shape of through-hole 321 of the present embodiment. For example, the through-holes may have a structure that extends through the partition wall portions of the right wall portion in the front-rear direction. In addition, the through-holes may have a structure that obliquely extends through the partition wall portions of the right wall portion. The through-holes may be composed of a plurality of through-holes extending in different directions.

Right-side cushioning member 37R, which will be described later, is held in right-side holding portion 32R having the above-described configuration. In this state, right-side cushioning member 37R is prevented from coming off in the front-rear direction, the left-right direction, and the upper-lower direction by right-side holding portion 32R.

Figure 7:
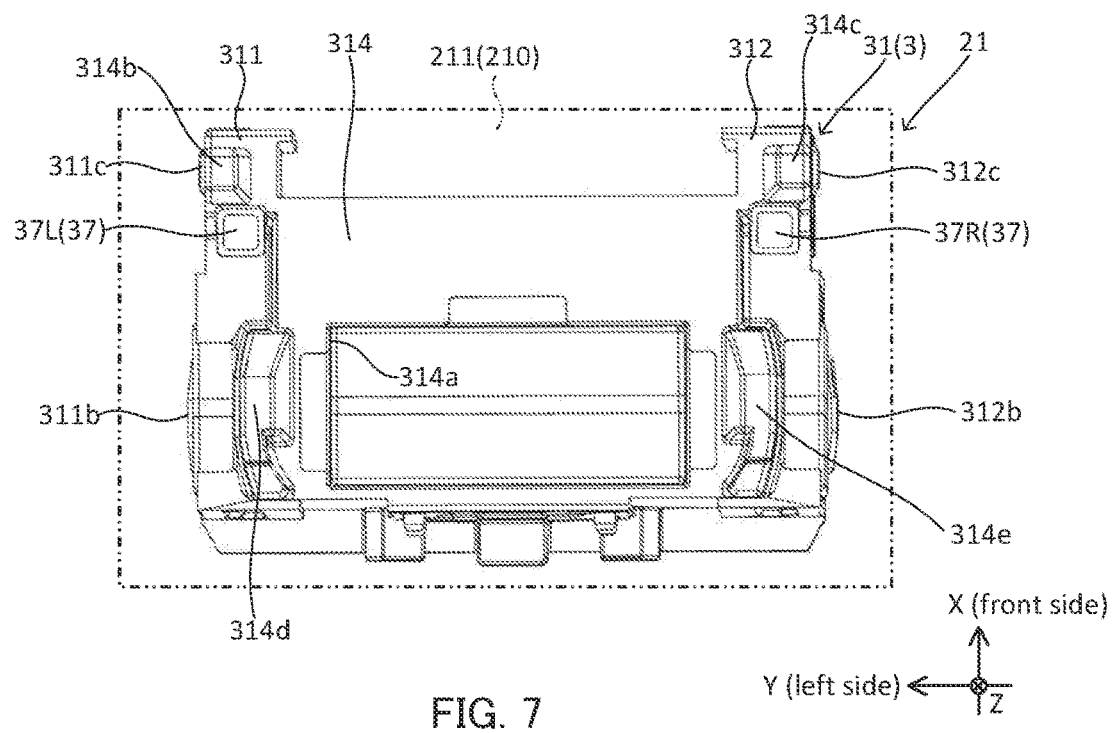
FIG. 7 is a bottom view of the holder.

Further, as illustrated in FIG. 7, holder 31 includes, on the lower-side surface, second magnet placement portion 314a for placing a second magnet of the second driving part. Second magnet placement portion 314a is formed in the form of a recessed portion. Second magnet placement portion 314a faces a second coil placement portion (not illustrated) of first base main body 210 in the upper-lower direction. A second coil (not illustrated) being a part of the second driving part is disposed in the second coil placement portion of first base main body 210.

Figure 8:
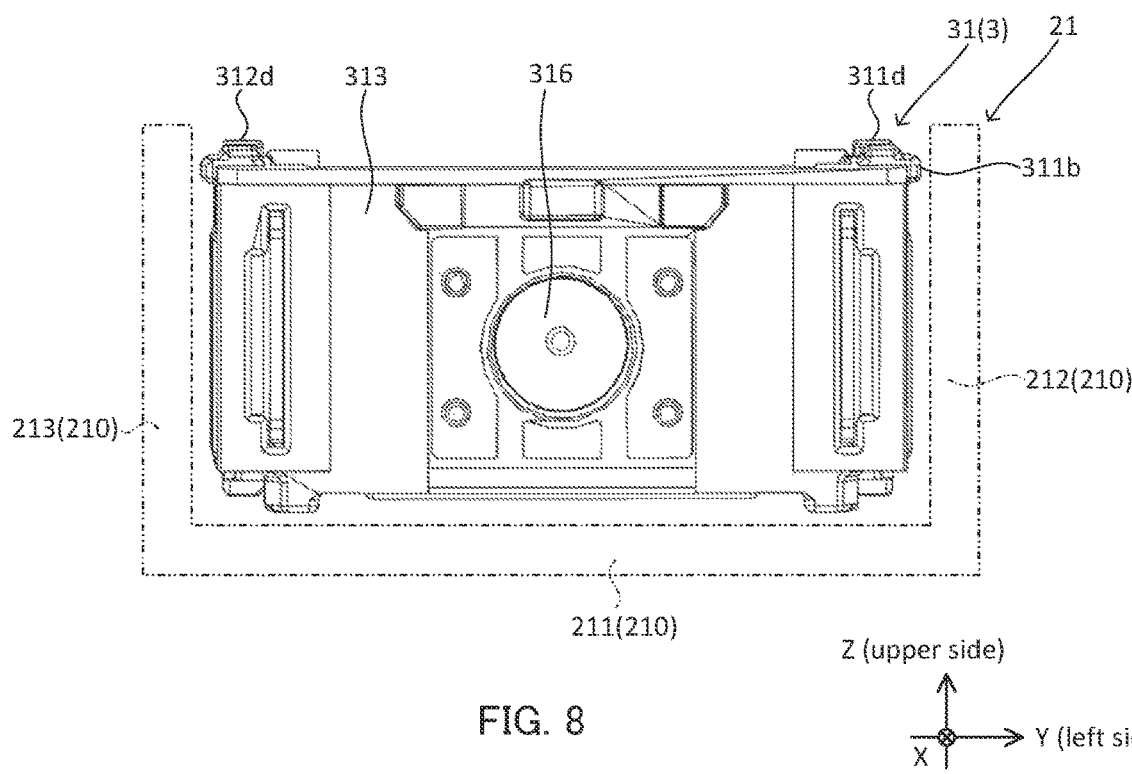
FIG. 8 is a rear view of the holder.
Figure 9:
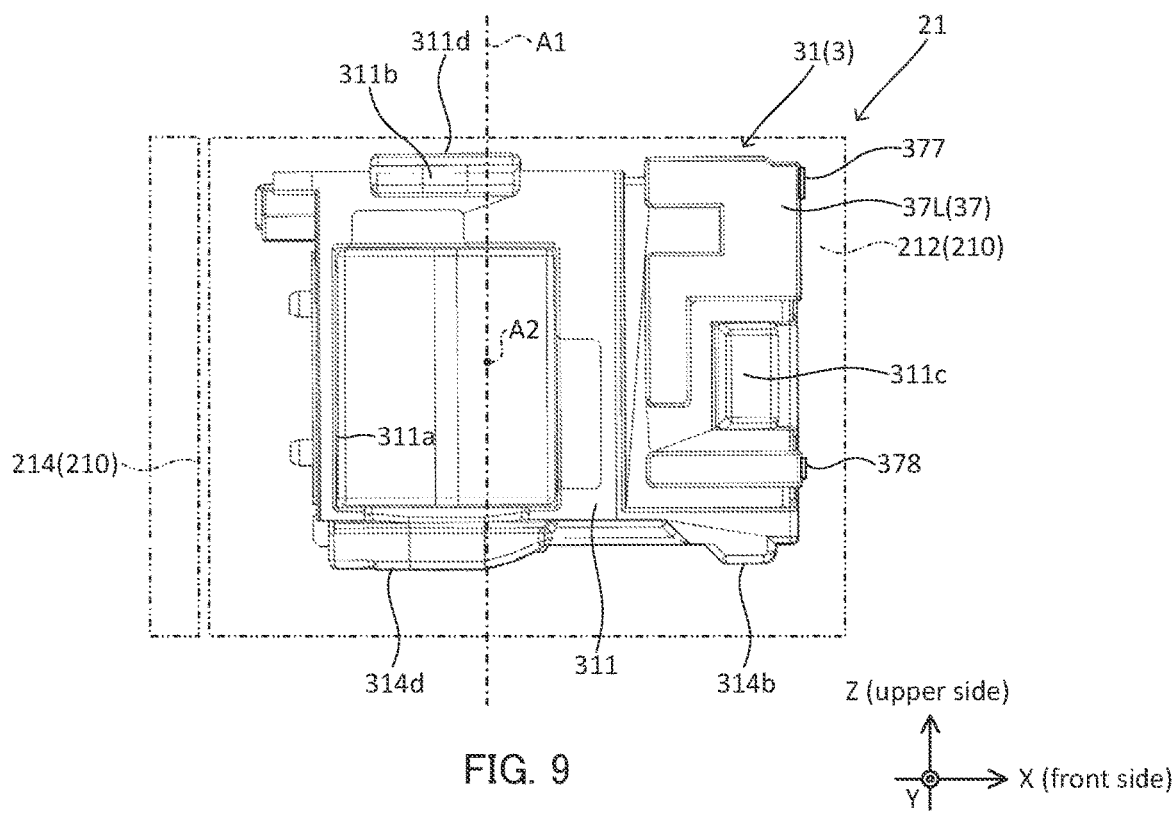
FIG. 9 is a left side view of the holder.
Figure 10:
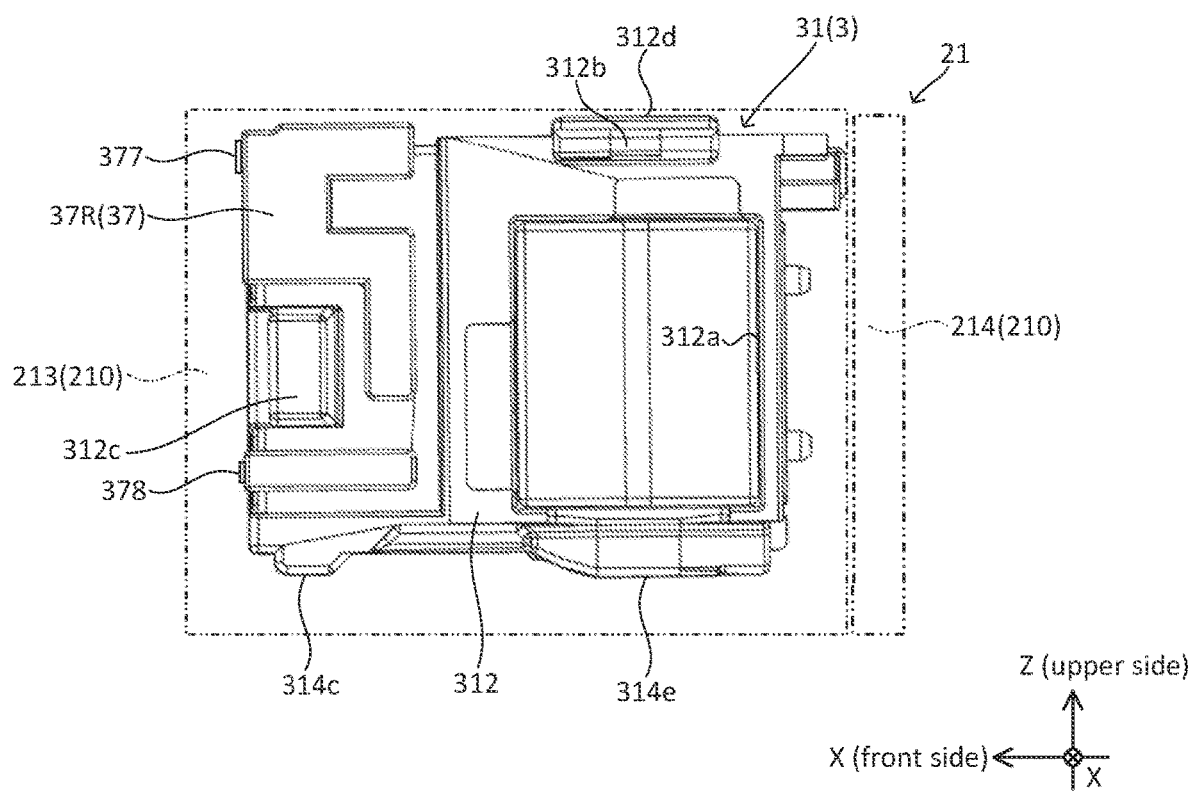
FIG. 10 is a right side view of the holder.

As illustrated in FIGS. 2 and 8, holder 31 includes recessed portion 316 in the rear-side surface. Recessed portion 316 extends forward from the rear-side surface of holder 31. In other words, recessed portion 316 extends toward the central portion of mounting surface 310 from the rear-side surface of holder 31. Supporting portion 214b of first base 21 is inserted into recessed portion 316.

Holder 31 having the above-described configuration is accommodated in first base 21. In this state, holder 31 is supported by first base 21 by swing supporting portion 33 swingably with respect to first base 21.

Next, cushioning member 37 will be described mainly with reference to FIGS. 11 and 12. When holder 31 swings by an amount equal to or greater than a predetermined amount in the normal operation of optical path bending module 2, cushioning member 37 comes into contact with first base 21 and absorbs an impact. As a result, cushioning member 37 suppresses damage to holder 31 and first base 21. Cushioning member 37 also contributes to suppression of abnormal noise. In addition, cushioning member 37 may be brought into contact with first base 21 or cover 93 to absorb an impact caused by the contact made when an impact is applied to camera module 1 and holder 31 is moved.

Cushioning member 37 includes left-side cushioning member 37L and right-side cushioning member 37R. Left-side cushioning member 37L and right-side cushioning member 37R are symmetrical to each other.

Left-side cushioning member 37L is an integrally molded article made of an elastic material such as an elastomer, and is held on left-side holding portion 32L of holder 31 such that left-side cushioning member 37L is prevented from coming off. Left-side cushioning member 37L includes a portion held by groove portion 320 of left-side holding portion 32L and a portion held by through-hole 321 of left-side holding portion 32L.

Specifically, right-side cushioning member 37R includes first held portion 371 held by groove portion 320 of left-side holding portion 32L (see FIG. 5A), and second held portions 372a, 372b, and 372c held by through-holes 321a, 321b, and 321c of left-side holding portion 32L. First held portion 371 and second held portions 372a, 372b, and 372c are integrally formed.

First held portion 371 is formed by a combination of a plurality of first held portion elements having shapes conforming to the groove elements constituting groove portion 320 of left-side holding portion 32L. First held portion 371 as described above has a shape conforming to groove portion 320 of left-side holding portion 32L, and is held (fitted) in groove portion 320 of left-side holding portion 32L without any gap.

Each of second held portions 372a, 372b, and 372c connects the first held portion elements constituting first held portion 371 to one another. The thickness dimension of each of second held portions 372a, 372b, and 372c is smaller than the thickness dimension of first held portion 371.

Second held portion 372a is disposed inside through-hole 321a of left wall portion 311. The outer peripheral surface of second held portion 372a and the inner peripheral surface of through-hole 321a of left wall portion 311 are brought into contact with each other without any gap. In this state, second held portion 372a is prevented from coming off in the front-rear direction and the left-right direction by through-hole 321a.

Second held portion 372b is disposed inside through-hole 321b of left wall portion 311. The outer peripheral surface of second held portion 372b and the inner peripheral surface of through-hole 321b of left wall portion 311 are brought into contact with each other without any gap. In this state, second held portion 372b is prevented from coming off in the front-rear direction and the left-right direction by through-hole 321b.

Second held portion 372c is disposed inside through-hole 321c of left wall portion 311. The outer peripheral surface of second held portion 372c and the inner peripheral surface of through-hole 321c of left wall portion 311 are brought into contact with each other without any gap. In this state, second held portion 372c is prevented from coming off in the front-rear direction and the left-right direction by through-hole 321c.

Further, left-side cushioning member 37L includes upper-side receiving portion 373 at an upper end portion thereof. Upper-side receiving portion 373 is a portion protruding upward from upper-side opening portion 320a in left-side holding portion 32L of holder 31.

The upper-side surface of upper-side receiving portion 373 and the upper-side surface of upper-side receiving portion 311d of holder 31 are located on the same plane that is parallel to the XY plane, or the upper-side surface of upper-side receiving portion 373 is located slightly below upper-side receiving portion 311d of holder 31. Upper-side receiving portion 373 as described above is a portion that is brought into contact with cover 93 and receives an impact caused by the contact made when an impact is applied to camera module 1 and holder 31 is moved upward.

Further, left-side cushioning member 37L includes left-side receiving portion 374 at the left-side surface. The left-side surface of left-side receiving portion 374 protrudes leftward from the left-side surface of left wall portion 311 of holder 31. Left-side receiving portion 374 is a portion that makes contact with first base 21 and receives an impact caused by the contact made when an impact is applied to camera module 1 and holder 31 is moved leftward.

Further, left-side cushioning member 37L includes front-side receiving portions 377 and 378 at the front end portion. Front-side receiving portion 377 is a portion protruding forward from front-side opening portion 320b in left-side holding portion 32L of holder 31.

The front-side surface of front-side receiving portion 377 is a portion that comes into contact with base-side receiving portion 212a of first base 21 and absorbs an impact when holder 31 swings about second axis A2 in one direction (clockwise direction in FIG. 2) by an amount equal to or greater than a predetermined amount in the normal operation of optical path bending module 2. Front-side receiving portion 377 is also a portion that makes contact with base-side receiving portion 212a of first base 21 and absorbs an impact caused by the contact made when an impact is applied to camera module 1 and holder 31 swings around second axis A2.

Front-side receiving portion 378 is a portion protruding forward from front-side opening portion 320c in left-side holding portion 32L of holder 31.

The front-side surface of front-side receiving portion 378 is a portion that comes into contact with base-side receiving portion 212a of first base 21 and absorbs an impact caused when holder 31 swings about second axis A2 in the other direction (the direction opposite to the clockwise direction in FIG. 2) by an amount equal to or greater than a predetermined amount in the normal operation of optical path bending module 2. Front-side receiving portion 378 is also a portion that makes contact with base-side receiving portion 212a of first base 21 and absorbs an impact caused by the contact made when an impact is applied to camera module 1 and holder 31 swings around second axis A2. The specific configuration of front-side receiving portions 377 and 378 will be described after the configuration of right-side cushioning member 37R is described.

Right-side cushioning member 37R is an integrally molded article made of an elastic material such as an elastomer, and is held by right-side holding portion 32R of holder 31 such that right-side cushioning member 37R is prevented from coming off. Right-side cushioning member 37R includes a portion held by groove portion 320 of right-side holding portion 32R and a portion held by through-hole 321 of right-side holding portion 32R.

Specifically, right-side cushioning member 37R includes first held portion 371 held by groove portion 320 of right-side holding portion 32R (see FIG. 5B), and second held portions 372a, 372b, and 372c held by through-holes 321a, 321b, and 321c of right-side holding portion 32R. First held portion 371 and second held portions 372a, 372b, and 372c are integrally formed.

First held portion 371 is formed by a combination of a plurality of first held portion elements having shapes conforming to the groove elements constituting groove portion 320 of right-side holding portion 32R. First held portion 371 has a configuration conforming to groove portion 320 of right-side holding portion 32R, and is held (fitted) in groove portion 320 of right-side holding portion 32R without any gap.

Each of second held portions 372a, 372b, and 372c connects the first held portion elements constituting first held portion 371 to one another. The thickness dimension of each of second held portions 372a, 372b, and 372c is smaller than the thickness dimension of first held portion 371.

Second held portion 372a is disposed inside through-hole 321a of right wall portion 312. The outer peripheral surface of second held portion 372a and the inner peripheral surface of through-hole 321a of right wall portion 312 are brought into contact with each other without any gap. In this state, second held portion 372a is prevented from coming off in the front-rear direction and the left-right direction by through-hole 321a.

Second held portion 372b is disposed inside through-hole 321b of right wall portion 312. The outer peripheral surface of second held portion 372b and the inner peripheral surface of through-hole 321b of right wall portion 312 are brought into contact with each other without any gap. In this state, second held portion 372b is prevented from coming off in the front-rear direction and the left-right direction by through-hole 321b.

Second held portion 372c is disposed inside through-hole 321c of right wall portion 312. The outer peripheral surface of second held portion 372c and the inner peripheral surface of through-hole 321c of right wall portion 312 are brought into contact with each other without any gap. In this state, second held portion 372c is prevented from coming off in the front-rear direction and the left-right direction by through-hole 321c.

Right-side cushioning member 37R includes upper-side receiving portion 373 at an upper end portion thereof. Upper-side receiving portion 373 is a portion of left-side cushioning member 37L that protrudes upward from upper-side opening portion 320a in groove portion 320 of right-side holding portion 32R.

The upper-side surface of upper-side receiving portion 373 and the upper-side surface of upper-side receiving portion 312d of holder 31 are located on the same plane that is parallel to the XY plane, or the upper-side surface of upper-side receiving portion 373 is located slightly below upper-side receiving portion 312d of holder 31. Such an upper-side receiving portion 373 is a portion that is brought into contact with cover 93 and receives an impact caused by the contact made when an impact is applied to camera module 1 and holder 31 is moved upward.

Further, right-side cushioning member 37R includes right-side receiving portion 376 at the right-side surface. The right-side surface of right-side receiving portion 376 protrudes to the right side of the right-side surface of right wall portion 312 of holder 31. Right-side receiving portion 376 is a portion that makes contact with first base 21 and receives an impact caused by the contact made when an impact is applied to camera module 1 and holder 31 is moved rightward.

Further, right-side cushioning member 37R includes front-side receiving portions 377 and 378 at the front end portion. Front-side receiving portion 377 protrudes forward from front-side opening portion 320b of right-side holding portion 32R of holder 31.

The front-side surface of front-side receiving portion 377 is a portion that comes into contact with base-side receiving portion 213a of first base 21 and absorbs an impact when holder 31 swings about second axis A2 in one direction (a direction opposite to the clockwise direction in FIG. 2) by an amount equal to or greater than a predetermined amount in the normal operation of optical path bending module 2. Front-side receiving portion 377 is also a portion that makes contact with base-side receiving portion 213a of first base 21 and absorbs an impact caused by the contact made when an impact is applied to camera module 1 and holder 31 swings around second axis A2 in one direction.

Front-side receiving portion 378 is a portion protruding forward from front-side opening portion 320c in right-side holding portion 32R of holder 31.

The front-side surface of front-side receiving portion 378 is a portion that comes into contact with base-side receiving portion 213a of first base 21 and absorbs an impact when holder 31 swings about second axis A2 in the other direction (clockwise direction in FIG. 2) by an amount equal to or greater than a predetermined amount in the normal operation of optical path bending module 2. Front-side receiving portion 378 is also a portion that makes contact with base-side receiving portion 213a of first base 21 and absorbs an impact caused by the contact made when an impact is applied to camera module 1 and holder 31 swings around second axis A2.

Then, referring to FIGS. 11, 12, 14A, and 14B, a specific configuration of front-side receiving portions 377 and 378 of left-side cushioning member 37L and right-side cushioning member 37R will be described.

Figure 11:
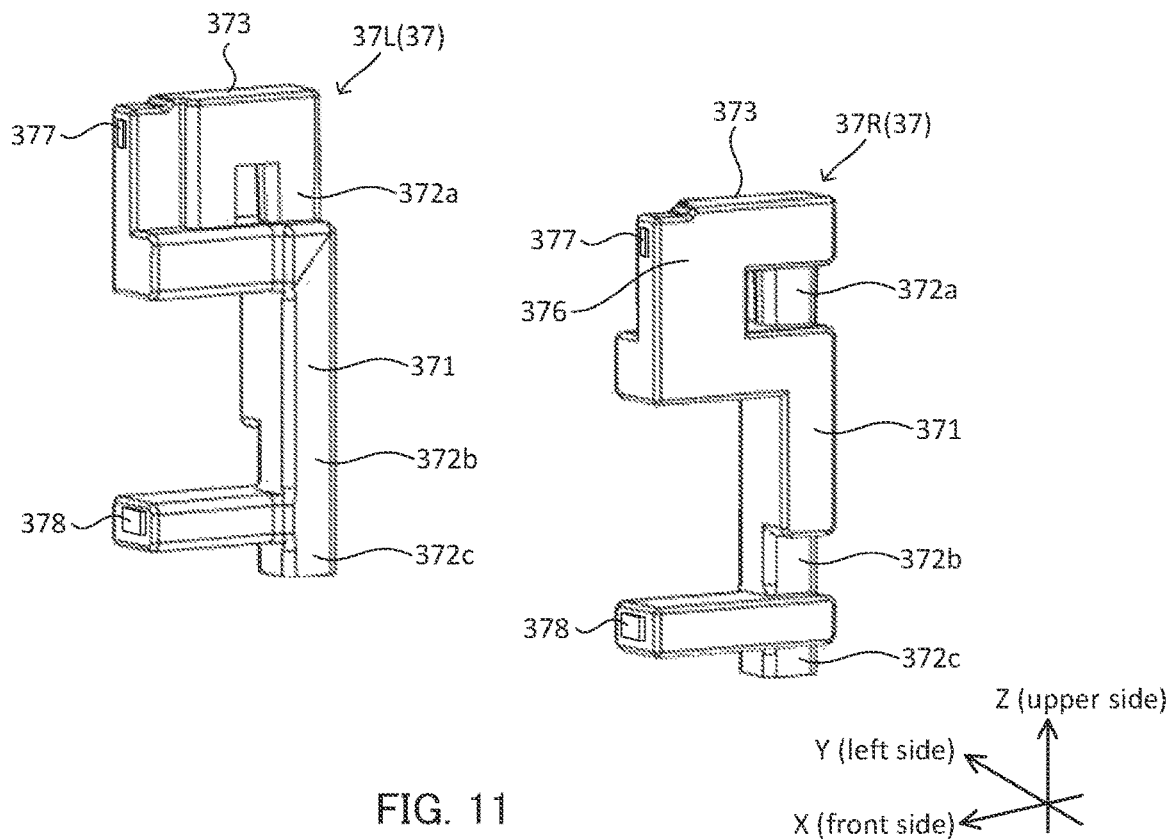
FIG. 11 is a perspective view of a cushioning member.
Figure 12:
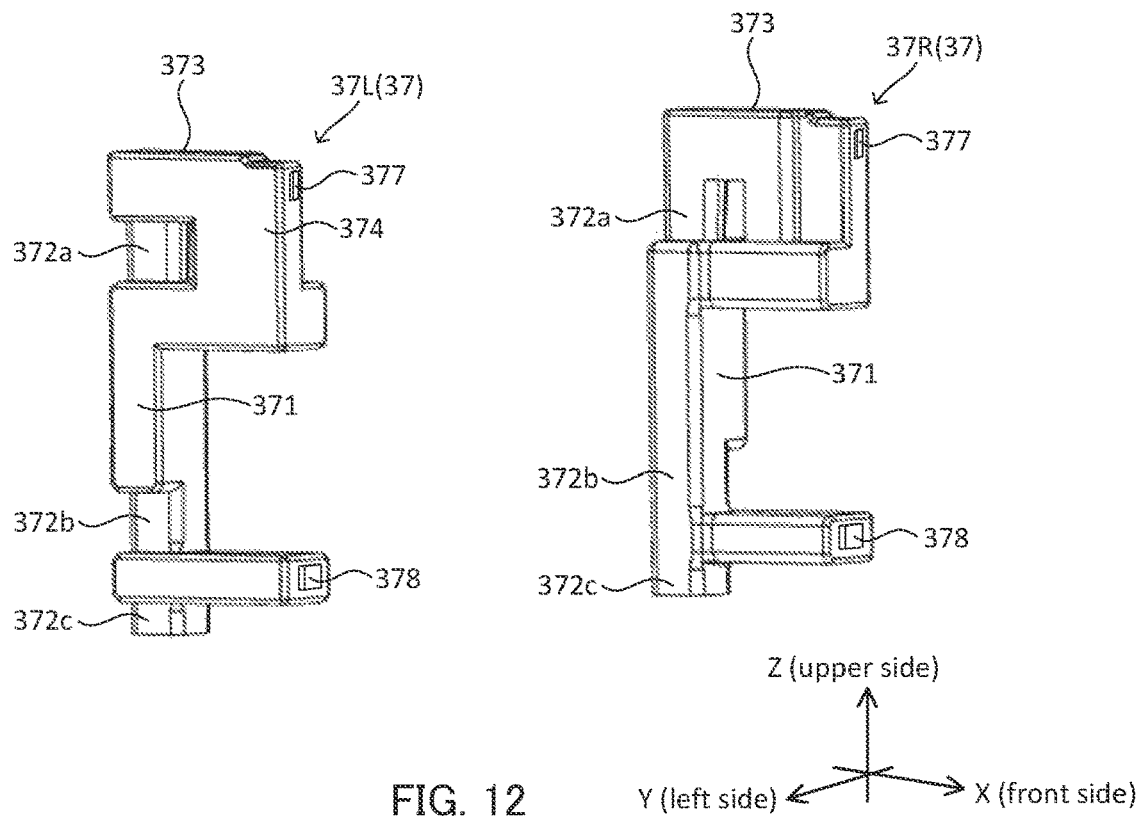
FIG. 12 is a perspective view of the cushioning member.
Figure 13:
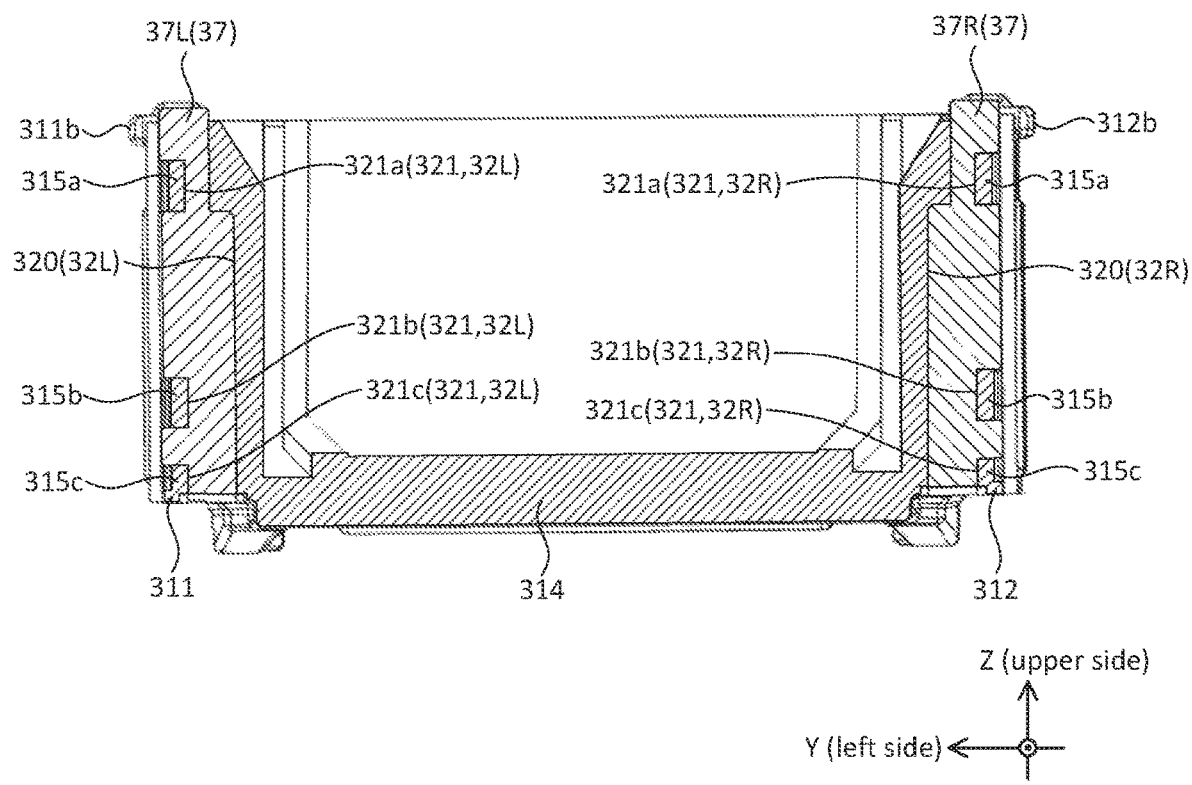
FIG. 13 is an X-X sectional view of the holder illustrated in FIG. 4.
Figure 14A:
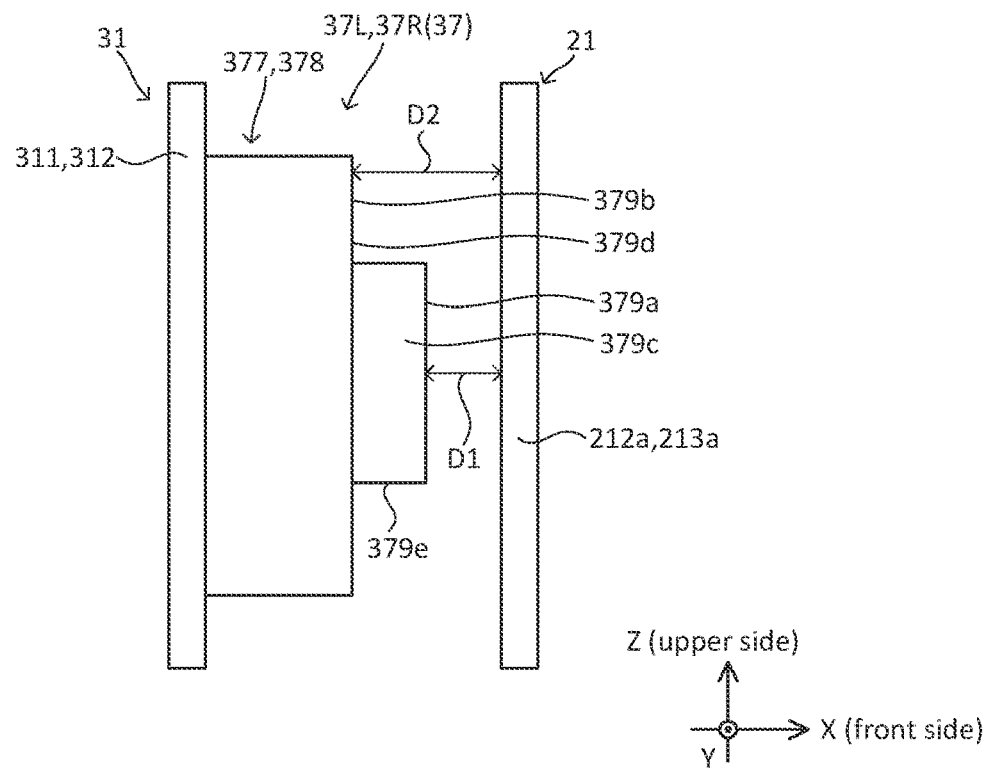
FIG. 14A is a schematic view for explaining a front-side receiving portion of the cushioning member.

FIG. 14A is a schematic view schematically illustrating front-side receiving portions 377 and 378 illustrated in FIGS. 11 and 12. Portions of holder 31 (the front end portion of left wall portion 311 and the front end portion of right wall portion 312) are also schematically illustrated in FIG. 14A. In addition, portions of first base 21 (base-side receiving portion 212a and base-side receiving portion 213a) are also schematically illustrated in FIG. 14A.

Specifically, each of front-side receiving portions 377 and 378 includes first cushioning surface 379a and second cushioning surface 379b.

Each of first cushioning surfaces 379a is a surface parallel to the YZ plane and faces forward. First cushioning surface 379a faces base-side receiving portion 212a or 213a via first distance D1 in the front-rear direction in a neutral state where optical path bending module 2 is not swinging. First cushioning surface 379a can make contact with base-side receiving portion 212a or 213a during the normal operation of optical path bending module 2.

First cushioning surface 379a is dispose on the tip end surface of protruding portion 379c disposed on the front end portion of each of left-side cushioning member 37L and right-side cushioning member 37R. Protruding portion 379c protrudes forward from the front end portion of each of left-side cushioning member 37L and right-side cushioning member 37R.

Second cushioning surface 379b is a surface parallel to the YZ plane and faces forward. Second cushioning surface 379b faces base-side receiving portion 212a or 213a via second distance D2 in the front-rear direction in the neutral state where optical path bending module 2 is not swinging. Second distance D2 is greater than first distance D1 (D2>D1). Second cushioning surface 379b can make contact with base-side receiving portion 212a or 213a when an impact is applied to camera module 1 and holder 31 swings about second axis A2.

Second cushioning surface 379b is formed on the bottom portion of recessed portion 379d existing around protruding portion 379c at the front end portion of each of left-side cushioning member 37L and right-side cushioning member 37R. Second cushioning surface 379b and first cushioning surface 379a are connected by step portion 379e formed on the outer peripheral surface of protruding portion 379c.

Note that, recessed portion 379d is a portion provided to surround protruding portion 379c at the front end portion of each of left-side cushioning member 37L and right-side cushioning member 37R, and means a portion located on the rear side of protruding portion 379c (that is, a side farther from base-side receiving portion 212a or 213a).

Next, the operation of the above-described front-side receiving portions 377 and 378 will be described. To begin with, when holder 31 swings about second axis A2 in one direction (clockwise direction in FIG. 2) by an amount equal to or greater than a predetermined amount in the normal operation of optical path bending module 2, first cushioning surfaces 379a of front-side receiving portions 377 make contact with base-side receiving portions 212a and 213a. At this time, although protruding portions 379c of front-side receiving portions 377 are collapsed, second cushioning surfaces 379b of front-side receiving portions 377 do not make contact with base-side receiving portions 212a and 213a.

In the present embodiment, even when first cushioning surfaces 379a of front-side receiving portions 377 make contact with base-side receiving portions 212a and 213a in the normal operation of optical path bending module 2, the hardness and height of protruding portions 379c are set so that second cushioning surfaces 379b of front-side receiving portions 377 do not make contact with base-side receiving portions 212a and 213a.

Figure 14B:
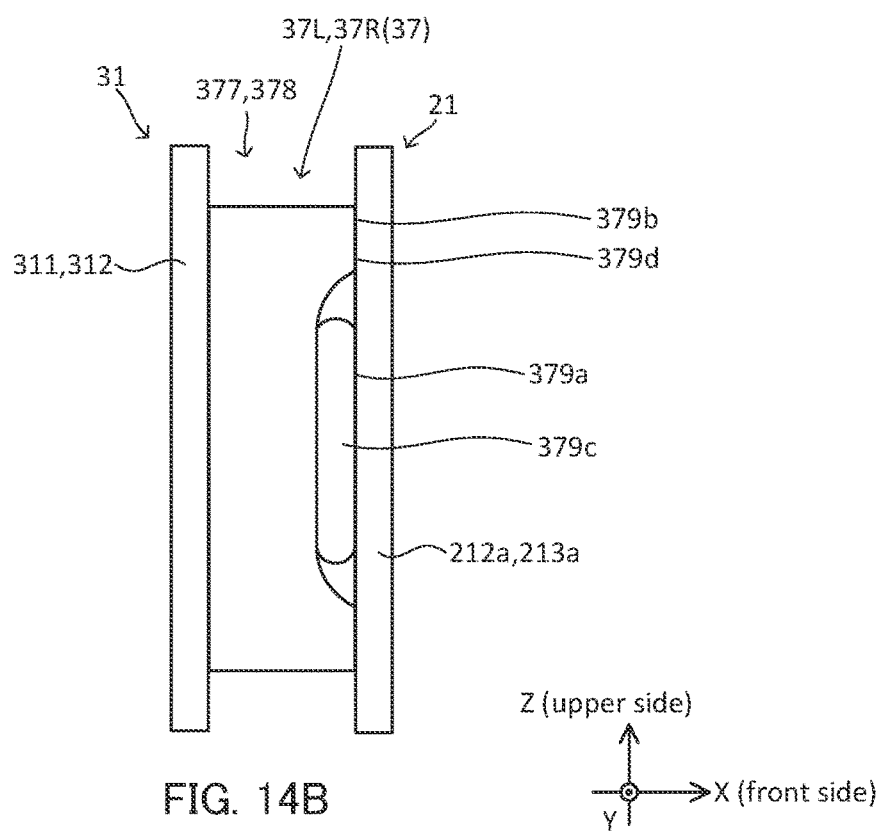
FIG. 14B is a schematic view for explaining the front-side receiving portion of the cushioning member.

In addition, when an impact is applied to camera module 1 and holder 31 swings in one direction about second axis A2, first cushioning surfaces 379a of front-side receiving portions 377 come into contact with base-side receiving portions 212a and 213a. Then, as illustrated in FIG. 14B, protruding portions 379c collapse, and second cushioning surfaces 379b of front-side receiving portions 377 make contact with base-side receiving portions 212a and 213a. In this state, first cushioning surfaces 379a and second cushioning surfaces 379b of front-side receiving portions 377 make contact with base-side receiving portions 212a and 213a. Thereafter, first cushioning surfaces 379a and second cushioning surfaces 379b are collapsed, and the impact is absorbed by first cushioning surfaces 379a and second cushioning surfaces 379b.

In the present embodiment, the hardness and height of protruding portions 379c are set so that second cushioning surfaces 379b of front-side receiving portions 377 make contact with base-side receiving portions 212a and 213a after an impact is applied to camera module 1 and first cushioning surfaces 379a of front-side receiving portions 377 make contact with base-side receiving portions 212a and 213a.

Note that, depending on the magnitude of the impact applied to camera module 1, only first cushioning surfaces 379*a* of front-side receiving portions 377 may make contact with base-side receiving portions 212*a* and 213*a*, and second cushioning surfaces 379*b* of front-side receiving portions 377 need not make contact with base-side receiving portions 212*a* and 213*a*.

Further, when holder 31 swings about second axis A2 in the other direction (clockwise direction in FIG. 2) by an amount equal to or greater than a predetermined amount in the normal operation of optical path bending module 2, first cushioning surfaces 379*a* of front-side receiving portions 378 make contact with base-side receiving portions 212*a* and 213*a*. At this time, although protruding portions 379*c* of front-side receiving portions 378 are collapsed, second cushioning surfaces 379*b* of front-side receiving portions 378 do not make contact with base-side receiving portions 212*a* and 213*a*.

In the present embodiment, the hardness and height of protruding portions 379*c* are set so that second cushioning surfaces 379*b* of front-side receiving portions 378 do not make contact with base-side receiving portions 212*a* and 213*a* even when first cushioning surfaces 379*a* of front-side receiving portions 378 make contact with base-side receiving portions 212*a* and 213*a* in the normal operation of optical path bending module 2.

In addition, when an impact is applied to camera module 1 and holder 31 swings in one direction about second axis A2, first cushioning surfaces 379*a* of front-side receiving portions 378 first come into contact with base-side receiving portions 212*a* and 213*a*. Then, as illustrated in FIG. 14B, protruding portions 379*c* collapse, and second cushioning surfaces 379*b* of front-side receiving portions 378 make contact with base-side receiving portions 212*a* and 213*a*. Thereafter, first cushioning surfaces 379*a* and second cushioning surfaces 379*b* are collapsed, and the impact is absorbed by first cushioning surfaces 379*a* and second cushioning surfaces 379*b*.

In the present embodiment, the hardness and height of protruding portions 379*c* are set so that second cushioning surfaces 379*b* of front-side receiving portions 378 make contact with base-side receiving portions 212*a* and 213*a* after an impact is applied to camera module 1 and first cushioning surfaces 379*a* of front-side receiving portions 378 make contact with base-side receiving portions 212*a* and 213*a*.

Note that, depending on the magnitude of the impact applied to camera module 1, only first cushioning surfaces 379*a* of front-side receiving portions 378 may make contact with base-side receiving portions 212*a* and 213*a*, and second cushioning surfaces 379*b* of front-side receiving portions 378 need not make contact with base-side receiving portions 212*a* and 213*a*.

Figure 15:
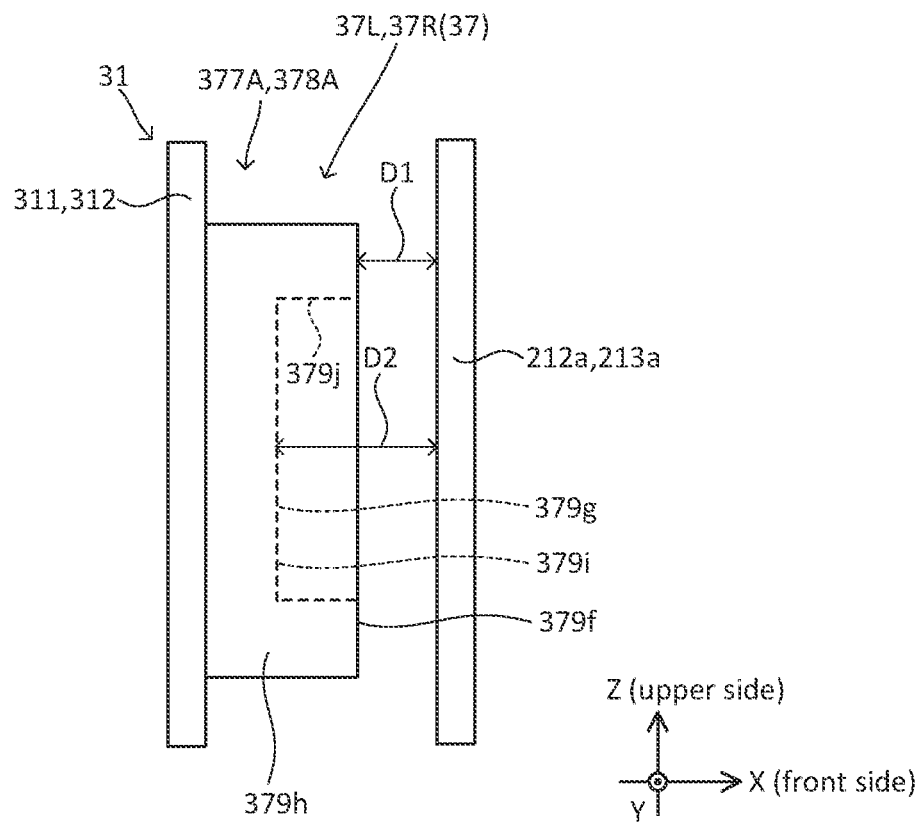
FIG. 15 is a schematic view illustrating a variation of the front-side receiving portion of the cushioning member.
Figure 16A:
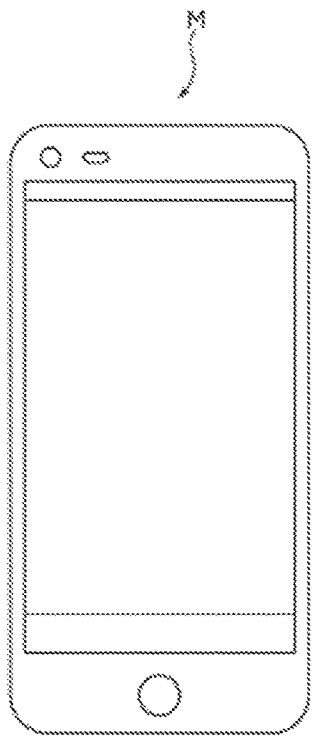
FIG. 16A is a diagram illustrating one example of a camera-mounted device in which the camera module is mounted.
Figure 16B:
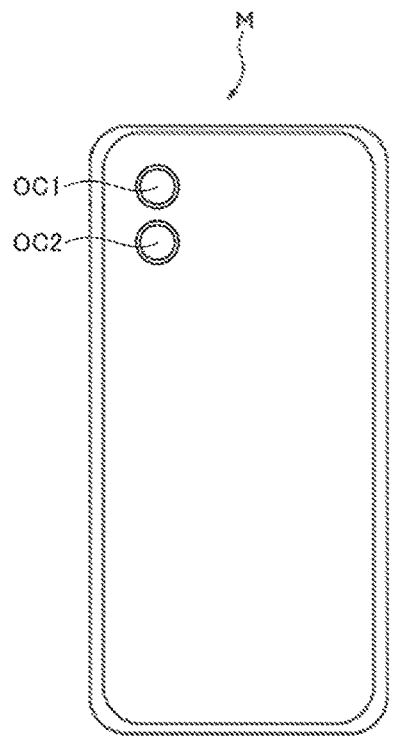
FIG. 16B is a diagram illustrating one example of the camera-mounted device in which the camera module is mounted.

Although the configuration of front-side receiving portions 377 and 378 has been described above, the configuration of the front-side receiving portions is not limited to the above-described configuration. For example, FIG. 15 is a schematic diagram illustrating a variation of front-side receiving portions 377A and 378A.

Each of front-side receiving portions 377A and 378A includes first cushioning surface 379*f* and second cushioning surface 379*g*.

First cushioning surface 379*f* is a surface parallel to the YZ plane and faces forward. First cushioning surface 379*f* faces base-side receiving portion 212*a* or 213*a* via first distance D1 in the front-rear direction in the neutral state where optical path bending module 2 is not swinging. First cushioning surface 379*f* can make contact with base-side receiving portion 212*a* or 213*a* during the normal operation of optical path bending module 2.

First cushioning surface 379*f* is disposed on the tip end surface of rectangular parallelepiped protruding portion 379*h* disposed on the front end portion of each of left-side cushioning member 37L and right-side cushioning member 37R. In the present embodiment, first cushioning surface 379*f* is a rectangular frame. Protruding portion 379*h* protrudes forward from the front end portion of each of left-side cushioning member 37L and right-side cushioning member 37R. First cushioning surface 379*f* is not limited to the rectangular frame. The shape of first cushioning surface 379*f* may be various shapes depending on the shape of protruding portion 379*h*.

Second cushioning surface 379*g* is a surface parallel to the YZ plane and faces forward. Second cushioning surface 379*g* faces base-side receiving portion 212*a* or 213*a* via second distance D2 in the front-rear direction in the neutral state where optical path bending module 2 is not swinging. Second distance D2 is greater than first distance D1 (D2>D1). Second cushioning surface 379*g* can make contact with base-side receiving portion 212*a* or 213*a* when an impact is applied to camera module 1 and holder 31 swings about second axis A2.

Second cushioning surface 379*g* is formed on the bottom portion of recessed portion 379*i* surrounded by protruding portion 379*h* at the front end portion of each of left-side cushioning member 37L and right-side cushioning member 37R. Second cushioning surface 379*g* and first cushioning surface 379*f* are connected by step portion 379*j* formed on an inner peripheral surface of protruding portion 379*h*.

The operation of front-side receiving portions 377A and 378A as described above is similar to that of front-side receiving portions 377 and 378 described above.

Next, swing supporting portion 33 will be described. As illustrated in FIG. 2, swing supporting portion 33 includes supporting portion 214*b* of first base 21, ball 331, recessed portion 316 of holder 31, and a biasing spring (not illustrated).

As illustrated in FIG. 2, supporting portion 214*b* is inserted into recessed portion 316. In addition, ball 331 is disposed between the tip end surface of supporting portion 214*b* and the receded end surface of recessed portion 316.

The biasing spring is disposed between the rear-side surface of holder 31 and supporting wall portion 214 of first base 21. The biasing spring is for biasing holder 31 rearward. In other words, the biasing spring biases recessed portion 316 toward supporting portion 214*b*. Therefore, ball 331 is sandwiched between recessed portion 316 and supporting portion 214*b*.

Lens module 4 includes cover 93, the second base (not illustrated), lens part 41, and the AF device (not illustrated). Cover 93 is the same as cover 93 of optical path bending module 2. In the present embodiment, the second base is integrally formed with first base 21 of optical path bending module 2.

Lens part 41 is disposed in an accommodation space existing between cover 93 and the second base so as to be held by a lens guide (not illustrated). Lens part 41 includes lens barrel 42 and one or more lenses 43 held by lens barrel 42. Lens part 41 is supported by the second base so as to be displaceable in the X direction via the lens guide.

The AF device is a driving part that displaces lens part 41 in the X-direction for autofocusing. The configuration of the AF device is not particularly limited. For example, the AF device may be an AF device with a motor (not illustrated) in which a rotational motion of the motor is converted into a linear motion in the X direction by a conversion device to move lens part 41 in the X direction.

Image capturing device module 9 is disposed on the + side of lens part 41 in the X direction. Image capturing device module 9 is configured to include an image capturing device such as, for example, a charge-coupled device (CCD) image capturing device, a complementary metal oxide semiconductor (CMOS) image capturing device. The image capturing device of image capturing device module 9 captures a subject image imaged by lens part 41 and outputs an electrical signal corresponding to the subject image. Sensor board 91 is electrically connected to image capturing device module 9, and power supply to image capturing device module 9 and output of an electric signal of the subject image captured by image capturing device module 9 are performed via sensor board 91. Such an image capturing device module 9 may have a conventionally known structure.

(Action and Effect of Present Embodiment)

According to camera module 1 of the present embodiment having the above-described configuration, it is possible to suppress occurrence of damage to the movable-side member and the fixed-side member and occurrence of abnormal noise by absorbing an impact caused when the movable-side member and the fixed-side member collide with each other.

Specifically, when holder 31 swings about second axis A2 (see FIG. 2) in one direction (a direction opposite to the clockwise direction in FIG. 2) by an amount equal to or greater than a predetermined amount in the normal operation of optical path bending module 2, front-side receiving portion 377 of left-side cushioning member 37L and front-side receiving portion 377 of right-side cushioning member 37R collide with first base 21 before holder 31 collides with first base 21, and absorb the impact at the time of the collision. As a result, occurrence of abnormal noise caused by the collision can be suppressed.

Further, when holder 31 swings in the other direction (clockwise direction in FIG. 2) around second axis A2 (see FIG. 2) by an amount equal to or greater than a predetermined amount in the normal operation of optical path bending module 2, front-side receiving portion 378 of left-side cushioning member 37L and front-side receiving portion 377 of right-side cushioning member 37R collide with first base 21 before holder 31 collides with first base 21, and absorb the impact at the time of the collision. As a result, generation of abnormal noise caused by the collision can be suppressed.

In addition, when holder 31 swings about first axis A1 (see FIG. 6) in one direction (clockwise direction in FIG. 6) by an amount equal to or greater than a predetermined amount in the normal operation of optical path bending module 2, left-side receiving portion 311b of holder 31 collides with first base 21 and receives an impact at the time of collision. The impact in the event of such a collision is greater than the impact that occurs in the normal operation of optical path bending module 2. Therefore, in the present embodiment, left-side receiving portion 311b, which is harder than cushioning member 37, is configured to receive an impact at the time of impact.

Further, when holder 31 swings about first axis A1 (see FIG. 6) in the other direction (the direction opposite to the clockwise direction in FIG. 6) by an amount equal to or greater than a predetermined amount in the normal operation of optical path bending module 2, right-side receiving portion 312c of holder 31 collides with first base 21 and receives an impact at the time of collision.

Further, when an impact is applied to camera module 1 and holder 31 swings about second axis A2 in one direction (the direction opposite to the clockwise direction in FIG. 2), front-side receiving portion 377 of left-side cushioning member 37L and front-side receiving portion 377 of right-side cushioning member 37R make contact with base-side receiving portion 212a and base-side receiving portion 213a of first base 21 before holder 31 comes into contact, and absorb the impact caused by the contact.

In addition, when an impact is applied to camera module 1 and holder 31 swings about second axis A2 in the other direction (clockwise direction in FIG. 2), front-side receiving portion 378 of left-side cushioning member 37L and front-side receiving portion 378 of right-side cushioning member 37R make contact with base-side receiving portion 212a and base-side receiving portion 213a of first base 21 before holder 31 comes into contact, and absorb the impact caused by the contact.

Further, when an impact is applied to camera module 1 and holder 31 is moved leftward, at least one of left-side receiving portion 311b of holder 31, left-side receiving portion 311c of holder 31, and left-side receiving portion 374 of left-side cushioning member 37L collides with first base 21. The positions of the receiving portions that make contact with first base 21 differ depending on the movement state of holder 31.

When an impact is applied to camera module 1 and holder 31 is moved rightward, at least one of right-side receiving portion 312b of holder 31, right-side receiving portion 312c of holder 31, and right-side receiving portion 376 of right-side cushioning member 37R collides with first base 21. The positions of the receiving portions that make contact with first base 21 differ depending on the movement state of holder 31.

When an impact is applied to camera module 1 and holder 31 is moved upward, at least one of upper-side receiving portion 311d of holder 31, upper-side receiving portion 312d of holder 31, upper-side receiving portion 373 of left-side cushioning member 37L, and upper-side receiving portion 373 of right-side cushioning member 37R collides with cover 93. The positions of the receiving portions that make contact with first base 21 differ depending on the movement state of holder 31.

When an impact is applied to camera module 1 and holder 31 is moved downward, at least one receiving portion of lower-side receiving portions 314b, 314c, 314d, and 314e of holder 31 collides with first base 21. The positions of the receiving portions that make contact with first base 21 differs depending on the movement state of holder 31.

Further, in camera module 1 according to the present embodiment, left-side cushioning member 37L and right-side cushioning member 37R of cushioning member 37 are held by holder 31 so as to be prevented from coming off. In particular, left-side cushioning member 37L and right-side cushioning member 37R are prevented from coming off in the X direction, the Y direction, and the Z direction by holder 31. Therefore, cushioning member 37 can be prevented from falling off from holder 31.

Further, the force of collision between holder 31 and first base 21 in the normal operation of optical path bending module 2 (hereinafter, referred to as "collision force during normal operation") is smaller than the force of collision between holder 31 and first base 21 caused when an impact is applied to camera module 1 (hereinafter, referred to as "collision force based on impact"). For this reason, front-side receiving portions 377 and 378 need to be imparted a shock absorbing capability sufficient to absorb the collision force based on the impact. However, when front-side receiving portions 377 and 378 are designed based on the collision force based on the impact, the capability (shape, weight, and the like) of front-side receiving portions 377 and 378 is overspecified with respect to the collision force during the normal operation. This may result in an increase in the sizes and weights of front-side receiving portions 377 and 378.

In contrast, in the present embodiment, front-side receiving portions 377 and 378 are designed to absorb the collision force in the normal operation only by using first cushioning surfaces 379a, and absorb the collision force based on the impact by using first cushioning surfaces 379a and second cushioning surfaces 379b. That is, front-side receiving portions 377 and 378 are imparted both a capability corresponding to the collision force during the normal operation and a capability corresponding to the collision force based on the impact. As a result, according to the present embodiment, it is possible to reduce the sizes and weights of front-side receiving portions 377 and 378.

(Additional Remarks)

While the present invention has been specifically described based on the embodiment, it is not intended to limit the present invention to the above-mentioned preferred embodiment, but the present invention may be further modified within the scope and spirit of the invention defined by the appended claims.

The above-described embodiment has been described in relation to an example in which the cushioning members are disposed in the optical path bending module. However, the cushioning members may be disposed in the lens module. In this case, one aspect of the optical actuator is configured as follows.

An optical actuator configured to move an optical element (a lens) by a driving part (an AF actuator or an optical image stabilization actuator), the optical actuator including:

a movable-side member (lens guide) configured to hold the optical element (lens);

a fixed-side member (second base) configured to support the movable-side member such that the movable-side member is movable; and a cushioning member disposed on the movable-side member (lens guide), in which the cushioning member includes a first cushioning surface and a second cushioning surface that face the fixed-side member (second base) at respective different distances, the first cushioning surface is capable of making contact with the fixed-side member (second base) during a normal operation of the optical actuator, and the first cushioning surface and the second cushioning surface are capable of making contact with the fixed-side member (second base) when an impact is applied to the optical actuator.

Further, the structure of the cushioning member is not limited to cushioning member 37 of the above-described embodiment. The structure of the cushioning member may be various structures having functions equivalent to those of front-side receiving portions 377 and 378 described with reference to FIGS. 14A and 14B. Further, in the above-described embodiment, the configuration relating to the first cushioning surface and the second cushioning surface is applied only to front-side receiving portions 377 and 378 of cushioning member 37. However, the configuration relating to the first cushioning surface and the second cushioning surface can be applied to various portions of the cushioning member which can be brought into contact with the fixed-side member in the normal operation of the optical actuator and can be brought into contact with the fixed-side member when an impact is applied to the optical actuator.

While smartphone M (see FIGS. 16A and 16B) serving as a camera-equipped mobile terminal has been described in the embodiment as one example of the camera-mounted device including camera module 1, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, and a camera-mounted in-vehicle device (for example, a rear-view monitor device or a drive recorder device). In addition, examples of the transporting apparatus include an automobile.

Figure 17A:
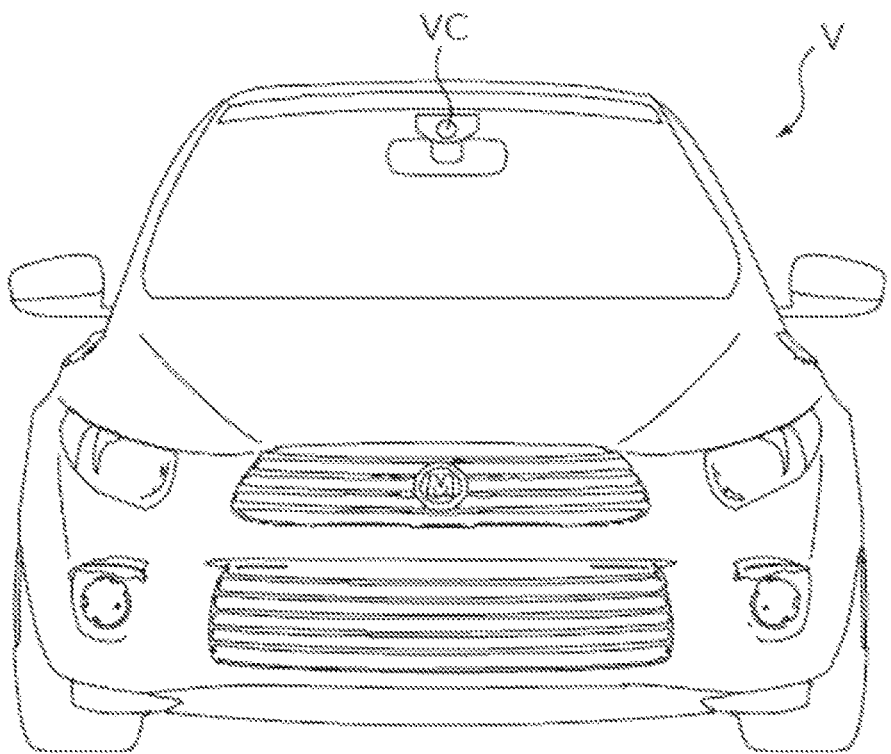
FIG. 17A is a diagram illustrating an automobile as a camera-mounted device in which an in-vehicle camera module is to be mounted.
Figure 17B:
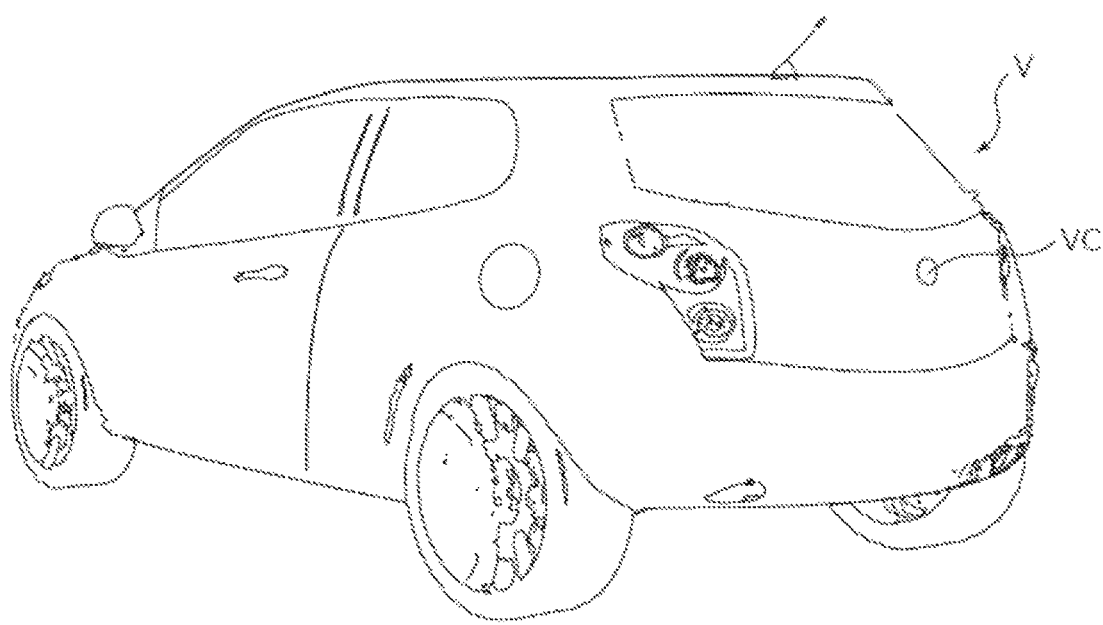
FIG. 17B is a diagram illustrating the automobile as the camera-mounted device in which the in-vehicle camera module is to be mounted.

FIGS. 17A and 17B illustrate automobile V serving as the camera-mounted device in which in-vehicle camera module VC (Vehicle Camera) is mounted. FIG. 17A is a front view of automobile V and FIG. 17B is a rear perspective view of automobile V. In automobile V, camera module 1 described in the embodiment is mounted as in-vehicle camera module VC. As illustrated in FIGS. 17A and 17B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

INDUSTRIAL APPLICABILITY

The optical actuator and the camera module according to the present invention can be mounted on a thin camera-mounted device such as, for example, a smartphone, a mobile phone, a digital camera, a notebook personal computer, a tablet terminal, a portable game machine, an in-vehicle camera.

REFERENCE SIGNS LIST

1 Camera module
2 Optical path bending module
21 First base
210 First base main body
211 Bottom wall portion
212 Left wall portion
212a Base-side receiving portion
213 Right wall portion
213a base-side receiving portion
214 Supporting wall portion
214a Rear wall portion
214b Supporting portion
22 Prism
3 Optical image stabilization device
31 Holder
310 Mounting surface
311 Left wall portion
311a Left-side first magnet placement portion
311b, 311c Left-side receiving portion
311d Upper-side receiving portion
312 Right wall portion
312a Right-side first magnet placement portion
312b, 312c Right-side receiving portion
312d Upper-side receiving portion
313 Rear wall portion
314 Bottom wall portion 314a Second magnet placement portion
314b, 314c, 314d, 314e Lower-side receiving portion
315a, 315b, 315c Partition wall portion
316 Recessed portion
32L Left-side holding portion
32R Right-side holding portion
320 Groove portion
320a Upper-side opening portion
320b, 320c Front-side opening portion
321, 321a, 321b, 321c Through-hole
33 Swing supporting portion
331 Ball
37 Cushioning member
37L Left-side cushioning member
37R Right-side cushioning member
371 First held portion
372a, 372b, 372c Second held portion
373 Upper-side receiving portion
374 Left-side receiving portion
377, 377A Front-side receiving portion
378, 378A Front-side receiving portion
379a, 379f First cushioning surface
379b, 379g Second cushioning surface
379c, 379h Protruding portion
379d, 379i Recessed portion
379e, 379j Step portion
376 Right-side receiving portion
4 Lens module
41 Lens part
42 Lens barrel
43 Lens
9 Image capturing device module
90 Image capturing device
91 Sensor board
92 Control part
93 Cover

The invention claimed is:

1. An optical actuator configured to move an optical element by a driving part, the optical actuator comprising:
   a movable-side member configured to hold the optical element;
   a fixed-side member configured to support the movable-side member such that the movable-side member is movable; and
   a cushioning member disposed on the movable-side member, wherein
   the cushioning member includes a first cushioning surface and a second cushioning surface that face the fixed-side member at respective different distances,
   wherein:
   the cushioning member is such that the first cushioning surface is capable of making contact with the fixed-side member first, and thereafter the first cushioning surface and the second cushioning surface are capable of making contact with the fixed-side member; and
   after the first cushioning surface makes contact with the fixed-side member, the first cushioning surface collapses, and the second cushioning surface together with the first cushioning surface makes contact with the fixed-side member, and even thereafter, the second cushioning surface collapses.

2. The optical actuator according to claim 1, wherein the cushioning member is an integrally molded article made of an elastomer.

3. The optical actuator according to claim 1, wherein the cushioning member includes a protruding portion and a recessed portion, wherein the first cushioning surface is formed on a tip end of the protruding portion, and the second cushioning surface is formed on a bottom portion of the recessed portion.

4. The optical actuator according to claim 3, wherein the recessed portion is disposed to surround the protruding portion.

5. The optical actuator according to claim 3, wherein the protruding portion is disposed to surround the recessed portion.

6. A camera module, comprising:
   an optical actuator according to claim 1; and
   an image capturing device disposed adjacently to the optical actuator.

7. A camera-mounted device, comprising:
   an camera module according to claim 6; and
   a control part configured to control the camera module.

* * * * *